United States Patent
Tatara

(10) Patent No.: US 8,870,424 B2
(45) Date of Patent: Oct. 28, 2014

(54) AUTOMOTIVE HEADLAMP APPARATUS FOR CONTROLLING LIGHT DISTRIBUTION PATTERN

(71) Applicant: Koito Manufacturing Co., Ltd., Tokyo (JP)

(72) Inventor: Naohisa Tatara, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 13/839,514

(22) Filed: Mar. 15, 2013

(65) Prior Publication Data

US 2013/0207543 A1   Aug. 15, 2013

Related U.S. Application Data

(62) Division of application No. 12/463,357, filed on May 8, 2009, now Pat. No. 8,562,192.

(30) Foreign Application Priority Data

| May 8, 2008 | (JP) | 2008-122763 |
| May 8, 2008 | (JP) | 2008-122764 |
| May 8, 2008 | (JP) | 2008-122765 |

(51) Int. Cl.
| F21V 17/02 | (2006.01) |
| B60Q 1/34  | (2006.01) |
| B60Q 1/02  | (2006.01) |
| B60Q 1/12  | (2006.01) |
| B60Q 1/14  | (2006.01) |
| B60Q 1/08  | (2006.01) |

(52) U.S. Cl.
CPC .. B60Q 1/08 (2013.01); B60Q 1/12 (2013.01); B60Q 2300/056 (2013.01); B60Q 1/143 (2013.01); B60Q 2300/41 (2013.01); B60Q 2300/42 (2013.01)
USPC ............... 362/512; 362/509; 701/1; 315/81; 315/82

(58) Field of Classification Search
CPC ................. B60Q 2300/056; B60Q 2300/054
USPC .............. 315/81, 82; 362/464–466, 507, 362/543–545
See application file for complete search history.

(56) References Cited

U.S. PATENT DOCUMENTS

| 5,730,519 | A | * | 3/1998 | Okuchi et al. ............... 362/559 |
| 6,254,259 | B1 | | 7/2001 | Kobayashi |

(Continued)

FOREIGN PATENT DOCUMENTS

| DE | 10355757 A1 | 6/2005 |
| DE | 102007018599 A1 | 10/2007 |

(Continued)

OTHER PUBLICATIONS

Japanese Office Action, Oct. 2, 2012, 6 pages.

(Continued)

Primary Examiner — Bhavesh V Amin
(74) Attorney, Agent, or Firm — Buchanan Ingersoll & Rooney PC

(57) ABSTRACT

An automotive headlamp apparatus includes headlamp units placed in a vehicle and a control unit which controls the illumination of the headlamp units. The headlamp units form a lower beam distribution pattern and an upper beam distribution pattern, and is configured so that a partial region of the upper beam distribution pattern can be non-illuminated. When the entirety of vehicle existent area of a vehicle-in-front travelling in front of a driver's vehicle is contained within the partial region, the control unit controls the headlamp units in such a manner that the partial region is non-illuminated; when at least a part of the vehicle existent area is contained within a region of the upper beam distribution pattern which is other than the partial region, the control unit controls the headlamp units in such a manner that the upper beam distribution pattern is not formed.

21 Claims, 24 Drawing Sheets

(56) References Cited

U.S. PATENT DOCUMENTS

| | | | |
|---|---|---|---|
| 6,343,869 B1 | 2/2002 | Kobayashi | |
| 6,459,387 B1 | 10/2002 | Kobayashi et al. | |
| 6,481,876 B2 | 11/2002 | Hayami et al. | |
| 6,511,215 B2* | 1/2003 | Hashigaya | 362/515 |
| 6,547,425 B2 | 4/2003 | Nishimura | |
| 6,550,944 B2* | 4/2003 | Kusagaya | 362/466 |
| 6,578,993 B2 | 6/2003 | Kobayashi et al. | |
| 6,623,149 B2 | 9/2003 | Leleve | |
| 6,722,775 B2 | 4/2004 | Komatsu | |
| 6,758,589 B2* | 7/2004 | Hayakawa et al. | 362/539 |
| 6,796,696 B2* | 9/2004 | Taniuchi | 362/539 |
| 6,817,744 B2* | 11/2004 | Tatsukawa | 362/544 |
| 6,960,005 B2* | 11/2005 | Daicho et al. | 362/466 |
| 7,044,624 B2 | 5/2006 | Taniuchi | |
| 7,195,378 B2 | 3/2007 | Fukawa et al. | |
| 7,290,909 B2* | 11/2007 | Komatsu et al. | 362/538 |
| 7,722,234 B2* | 5/2010 | Matsumoto | 362/539 |
| 8,132,947 B2* | 3/2012 | Shih | 362/547 |
| 8,235,570 B2* | 8/2012 | Okubo et al. | 362/539 |
| 8,523,417 B2* | 9/2013 | Kobayashi | 362/539 |
| 8,562,192 B2* | 10/2013 | Tatara | 362/512 |
| 2001/0000448 A1 | 4/2001 | Suzuki et al. | |
| 2001/0026454 A1 | 10/2001 | Komatsu et al. | |
| 2001/0040810 A1 | 11/2001 | Kusagaya | |
| 2001/0043474 A1* | 11/2001 | Kusagaya | 362/466 |
| 2003/0072164 A1 | 4/2003 | Watanabe et al. | |
| 2003/0086277 A1* | 5/2003 | Hayakawa et al. | 362/513 |
| 2003/0090906 A1* | 5/2003 | Hayakawa | 362/517 |
| 2004/0052083 A1* | 3/2004 | Daicho et al. | 362/466 |
| 2004/0213012 A1 | 10/2004 | Fukawa et al. | |
| 2004/0228139 A1 | 11/2004 | Taniuchi | |
| 2005/0117358 A1 | 6/2005 | Fukawa et al. | |
| 2005/0201117 A1 | 9/2005 | Sugimoto et al. | |
| 2007/0147055 A1 | 6/2007 | Komatsu | |
| 2008/0054161 A1 | 3/2008 | Schofield et al. | |
| 2008/0094715 A1 | 4/2008 | Schofield et al. | |

FOREIGN PATENT DOCUMENTS

| | | |
|---|---|---|
| DE | 102007032075 A1 | 1/2008 |
| EP | 1513103 A2 | 3/2005 |
| FR | 2088708 A5 | 1/1972 |
| JP | 01-244934 A | 9/1989 |
| JP | 07-101291 | 4/1994 |
| JP | 08166221 A | 6/1996 |
| JP | 2000-233684 | 8/2000 |
| JP | 2006-021706 A | 1/2006 |
| JP | 2007-179969 A | 7/2007 |
| JP | 2007293688 A | 11/2007 |
| JP | 2008-37240 | 2/2008 |
| JP | 2008037240 | 2/2008 |
| JP | 2008-094127 A | 4/2008 |
| JP | 2008094249 A | 4/2008 |

OTHER PUBLICATIONS

Japanese Office Action, Oct. 2, 2012, 10 pages.
European Office Action dated Jan. 20, 2014 issued in corresponding EP Application No. 09159676.7, 4 pgs.
Japanese Office Action dated Jan. 7, 2014 issued in corresponding JP Application No. 2013-045186 with English translation, 7 pgs.
Japanese Office Action dated Jan. 7, 2014 issued in corresponding JP Application No. 2013-045187 with English translation, 4 pgs.
Japanese Office Action dated Jan. 7, 2014 issued in corresponding JP Application No. 2013-045188 with English translation, 7 pgs.
Japanese Office Action dated Jan. 7, 2014 issued in corresponding JP Application No. 2013-045189 with English translation, 8 pgs.

* cited by examiner

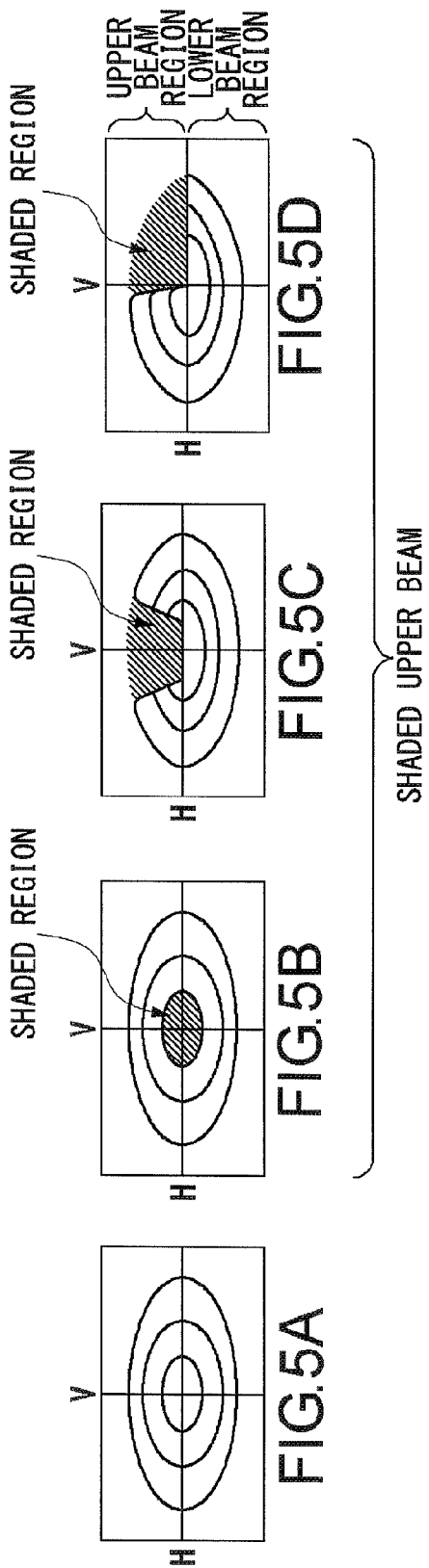

FIG.19

| No | EXAMPLES OF SHADED UPPER BEAM DISTRIBUTION PATTERN | SHADED REGION FIXED | SHADED REGION VARIABLE (POSITION, AREA, ETC.) |
|---|---|---|---|
| 1 | SHADED REGION IS CONTAINED WITHIN UPPER BEAM DISTRIBUTION PATTERN<br>SHADED REGION IS RECTANGULAR / SHADED REGION IS CIRCULAR | EXEMPLARY EMBODIMENT 1 WITH SWIVEL CAPABILITY | |
| 2 | SHADED REGION IS DIVIDED INTO RIGHT AND LEFT PARTS OF UPPER BEAM DISTRIBUTION PATTERN | | EXEMPLARY EMBODIMENT 2 WITHOUT SWIVEL CAPABILITY |
| 3 | SHADED REGION IS PROVIDED ON ONE SIDE OF UPPER BEAM DISTRIBUTION PATTERN | | |

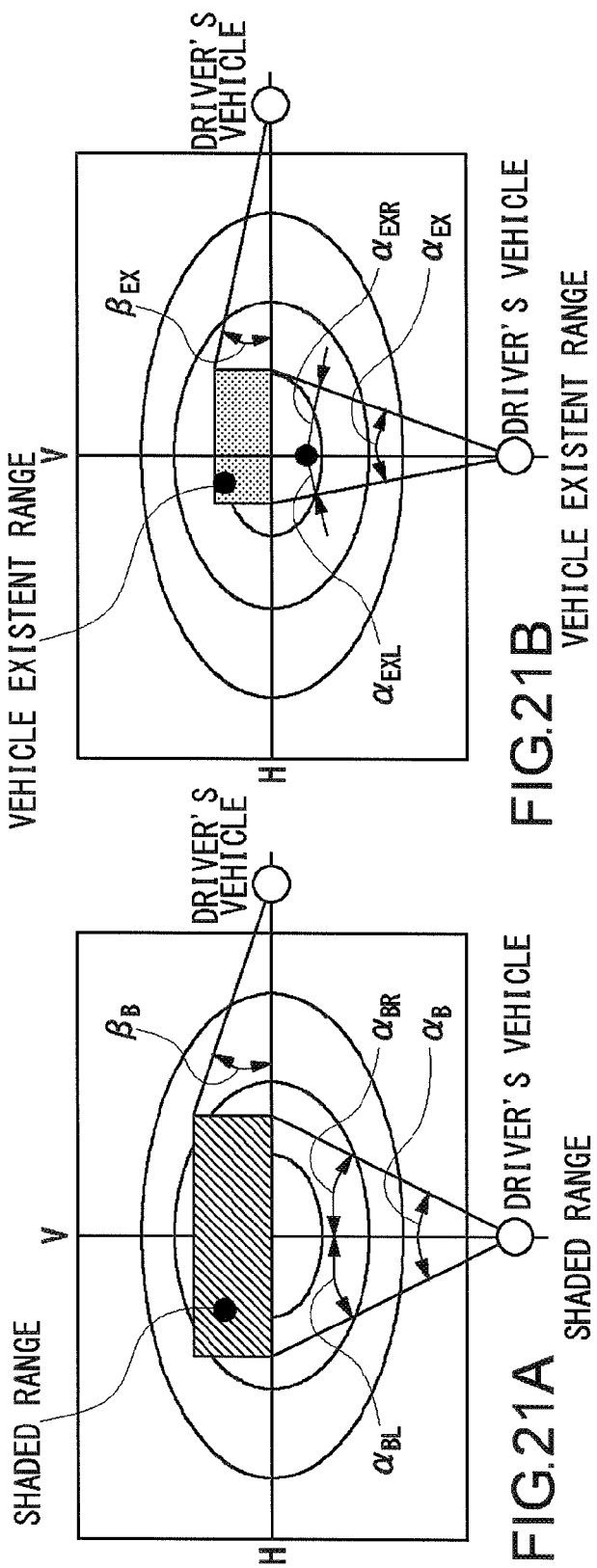

FIG.22

| | CONDITION FOR LOWER BEAM | CONDITION FOR SHADED UPPER BEAM | CONDITION FOR UPPER BEAM |
|---|---|---|---|
| DISTANCE REQUIREMENT | FLAG=Lo | FLAG=SHADED Hi | FLAG=Hi |
| AREA REQUIREMENT | $\alpha_{BL} > \alpha_{EXL}$ OR $\alpha_{BR} < \alpha_{EXR}$ OR $\beta_B < \beta_{EX}$ | $\alpha_{BL} \leq \alpha_{EXL}$ AND $\alpha_{BR} \geq \alpha_{EXR}$ AND $\beta_B \geq \beta_{EX}$ | |
| CORRECTION CONTROL OF SWIVEL ANGLE | $\alpha_B < \alpha_{EX}$ OR $\theta_{r-max} < |\theta_r|$ (WHERE $|\theta_r|$ IS SAME AS DEFINED IN THE RIGHT COLUMN) | IF $\alpha_B \geq \alpha_{EX}$ AND THE SMALLER VALUE ($|\theta_r|$) OF $|\alpha_{BR} - \alpha_{EXR}|$ AND $|\alpha_{BL} - \alpha_{EXL}|$ IS $\theta_{r-max}$ OR LESS, SWIVEL BY $\theta_r$ AND USE SHADED UPPER BEAM | |

FIG.25

| DISTANCE REQUIREMENT | CONDITION FOR LOWER BEAM | CONDITION FOR SHADED UPPER BEAM | CONDITION FOR UPPER BEAM |
|---|---|---|---|
| | FLAG=Lo | FLAG=SHADED Hi | FLAG=Hi |
| AREA REQUIREMENT | $\alpha_{BL} < \alpha_{BLLMT}$ OR $\alpha_{BRLMT} < \alpha_{BR}$ | $\alpha_{BLLMT} \leqq \alpha_{BL}$ AND $\alpha_{BR} \leqq \alpha_{BRLMT}$ | |
| VARIABLE CONTROL OF SHAPE OF SHADED REGION | | SHADED REGION IS VARIED SO THAT $\alpha_{BL} = \alpha_{EXL}$ $\alpha_{BR} = \alpha_{EXR}$ HOLD | |

AUTOMOTIVE HEADLAMP APPARATUS FOR CONTROLLING LIGHT DISTRIBUTION PATTERN

CROSS-REFERENCE TO RELATED APPLICATIONS

This application claims priority from U.S. application Ser. No. 12/463,357, filed May 8, 2009, which is based upon and claims the benefit of priority from the prior Japanese Patent Application No. 2008-122763, filed on May 8, 2008, Japanese Patent Application No. 2008-122764, filed on May 8, 2008, and Japanese Patent Application No. 2008-122765, filed on May 8, 2008, the entire contents of which are incorporated herein by reference.

BACKGROUND OF THE INVENTION

1. Field of the Invention

The present invention relates to an automotive headlamp apparatus used for vehicles and the like and a method for controlling the automotive headlamp apparatus.

2. Brief Description of Related Art

Generally, an automotive headlamp apparatus is capable of switching an illumination mode between a lower beam (low beam) and an upper beam (high beam). A lower beam is for illuminating an area close to, for example, a vehicle with a predefined intensity. Distribution of a lower beam is subject to provisions that provide for prevention of glare as experienced by oncoming vehicles or vehicles in front. A lower beam is primarily used on city streets. On the other hand, an upper beam is for illuminating wide areas ahead and distant areas with a relatively high illumination intensity. An upper beam is primarily used for high-speed driving on a road with relatively few oncoming vehicles and vehicles in front. As a result, the upper beam enhances the visibility of a driver much greater than the lower beam. However, an upper beam has a disadvantage of causing the driver of a vehicle or pedestrian ahead of the illuminating vehicle to experience a glare.

In the light of this, a technique is proposed where the light distribution in an upper beam region is varied. Disclosed in Japanese Patent Application Publication No. 2008-37240 is an automotive headlamp wherein when an illumination-prohibited object exists in any of a plurality of upper beam illumination areas, an upper beam unit, for use in an upper beam illumination area where the illumination-prohibited object lies in a plurality of upper beam units, is turned off.

The degree of glare experienced by a driver who drives a vehicle in front of a driver's own vehicle, which travels with high beam selected, changes with the distance. In view of this fact, Japanese Patent Application Publication No. 2000-233684 or Japanese Patent Application Publication No. Hei07-101291 discloses a headlamp apparatus that controls the glare in a manner such that a cut line is moved or the illumination of lamp is controlled in accordance with the position of a vehicle in front.

The above-described techniques are applied with a view to reducing the glare. Further reduction of the glare is desired in order to enhance the visibility.

SUMMARY OF THE INVENTION

The present invention has been made in view of the foregoing circumstances, and one of the purposes thereof is to provide a technology for improving the visibility by reducing the glare experienced by a vehicle running in front.

To resolve the foregoing problems, an automotive headlamp apparatus according to one embodiment of the present invention comprises: a headlamp unit placed in a vehicle; and a control unit which controls the illumination of the headlamp unit. The headlamp unit forms a lower beam distribution pattern and an upper beam distribution pattern, and is configured so that a partial region of the upper beam distribution pattern is capable of being non-illuminated. When the entirety of vehicle existent area of a vehicle-in-front travelling in front of a driver's vehicle is contained within the partial region, the control unit controls the headlamp unit in such a manner that the partial region is non-illuminated; when at least a part of the vehicle existent area thereof is contained within a region of the upper beam distribution pattern which is other than the partial region, the control unit controls the headlamp unit in such a manner that the upper beam distribution pattern is not formed.

Another embodiment of the present invention relates also to an automotive headlamp apparatus. This apparatus comprises: a headlamp unit placed in a vehicle; and a control unit which controls the illumination of the headlamp unit according to a vehicle existent area where a vehicle-in-front travelling in front of a driver's vehicle exists. The headlamp unit forms a lower beam distribution pattern and an upper beam distribution pattern, and is configured so that a partial region of the upper beam distribution pattern is capable of being non-illuminated. The control unit determines the vehicle existent area by excluding a vehicle-in-front which is not positioned in a predetermined vertical range as viewed from the driver's vehicle. When the entirety of vehicle existent area is contained within the partial region which can be non-illuminated, the control unit controls the headlamp unit in such a manner that the partial region is non-illuminated; when at least a part of the vehicle existent area is contained within a region of the upper beam distribution pattern which is other than the partial region, the control unit controls the headlamp unit in such a manner that the upper beam distribution pattern is not formed.

Still Another embodiment of the present invention relates also to an automotive headlamp apparatus. This apparatus comprises: a headlamp unit placed in a vehicle; and a control unit which controls the illumination of the headlamp unit according to a vehicle existent area where a vehicle-in-front travelling in front of a driver's vehicle exists. The headlamp unit forms a lower beam distribution pattern and an upper beam distribution pattern, and is configured so that a partial region of the upper beam distribution pattern is capable of being non-illuminated. The control unit determines the vehicle existent area, based a correction range which is wider by a predetermined angle than a basic range where the vehicle-in-front exists as seen from the driver's vehicle. When the entirety of vehicle existent area is contained within the partial region which can be non-illuminated, the control unit controls the headlamp unit in such a manner that the partial region is non-illuminated; when at least a part of the vehicle existent area is contained within a region of the upper beam distribution pattern which is other than the partial region, the control unit controls the headlamp unit in such a manner that the upper beam distribution pattern is not formed.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which:

FIGS. 5A to 5D show examples of upper beam distribution patterns;

FIG. 19 is a table showing examples of combination of the light distribution patterns in a shaded upper beam and the formation of shaded regions;

FIG. 21A is a diagram showing that a shaded range as viewed from a driver's vehicle in a situation of FIG. 20A is replaced by an on-screen projection; and FIG. 21B is a diagram showing that a vehicle existent range as viewed from a driver's vehicle in a situation of FIG. 20A is replaced by an on-screen projection;

FIG. 22 is a table showing detailed control conditions in a first exemplary embodiment;

FIG. 25 is a table showing detailed control conditions in a second exemplary embodiment.

DETAILED DESCRIPTION OF THE PREFERRED EMBODIMENTS

Figure 1:
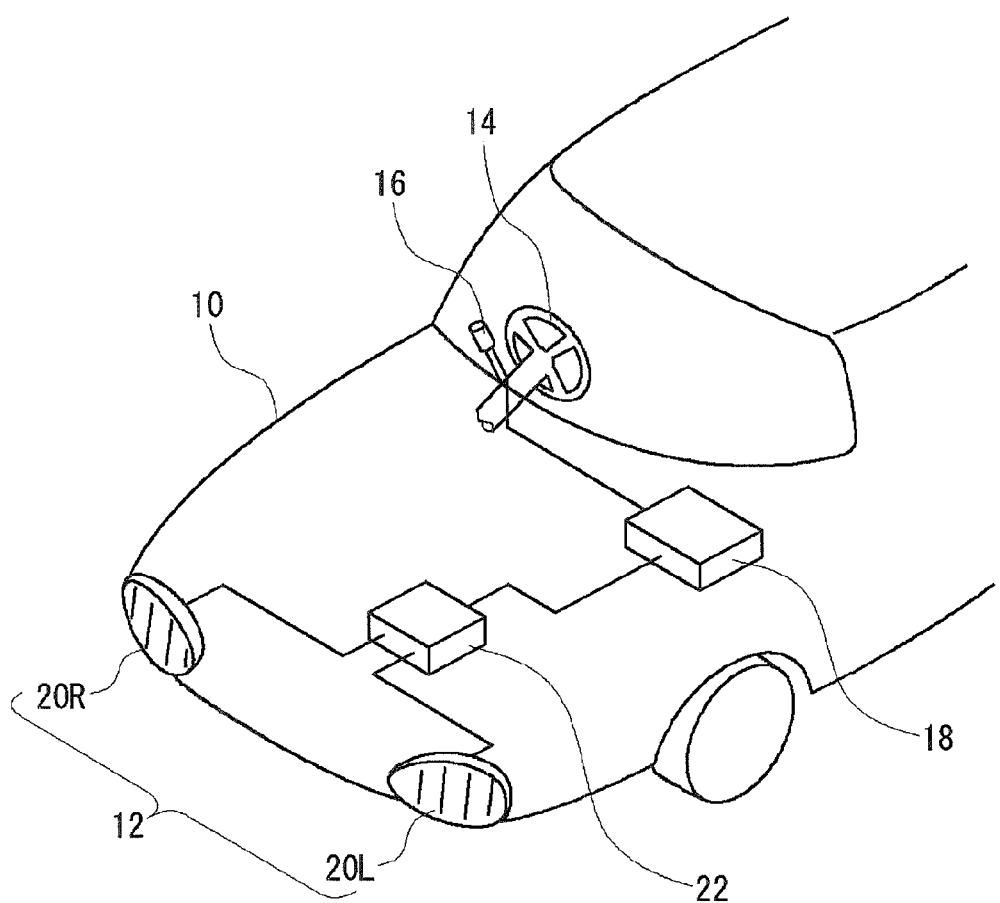
FIG. 1 is a schematic illustration showing an appearance of the front of a vehicle fitted with an automotive headlamp apparatus according to an embodiment of the present invention.

The invention will now be described by reference to the preferred embodiments. This does not intend to limit the scope of the present invention, but to exemplify the invention.

Hereinbelow, the embodiments will be described with reference to the accompanying drawings. Note that in all of the Figures the same reference numerals are given to the same components and the description thereof is omitted as appropriate.

(Embodiment)

FIG. 1 is a schematic illustration showing an appearance of the front of a vehicle fitted with an automotive headlamp apparatus according to an embodiment of the present invention. A vehicle 10 according to the present embodiment is provided with an automotive headlamp apparatus 12, a lamp mode selector switch 16, disposed near a steering wheel 14, for selecting a lamp mode as described later, and a vehicle controller 18 for processing information detected by a not-shown sensor on the vehicle or information on the selection of the lamp mode selector switch 16 by a driver and transmitting the result of the processing to the automotive headlamp apparatus 12.

The automotive headlamp apparatus 12 includes a pair of headlamp units 20R and 20L and a headlamp controller 22 for controlling the illumination, namely, the shape and position of light distribution pattern, from the respective headlamp units 20R and 20L. The headlamp controller 22 controls the headlamp units 20R and 20L by referring to a signal sent from the vehicle controller 18 in accordance with the distance between a driver's vehicle and a vehicle traveling in front of a driver's vehicle or the position of the vehicle in front thereof. Thus, with a lamp mode selected by an operation of the lamp mode selector switch 16, the headlamp controller 22 according to the present embodiment controls the illumination by the headlamp units 20R and 20L according to the selected lamp mode.

The lamp modes set as selectable by the lamp mode selector switch 16 as described herein are a driving beam mode (upper beam mode), a passing beam mode (lower beam mode), and an auto-adjusted beam mode (shaded upper beam mode). The auto-adjusted beam mode is a mode in which the light distribution pattern is adjusted according to the distance between the driver's vehicle and a vehicle traveling ahead of the driver's vehicle or the position of the vehicle ahead thereof. The shaded upper beam mode, as will be detailed later, is a mode in which a shaded upper beam is formed by making a partial region of the upper beam distribution pattern non-illuminated as appropriate so as to reduce glare as experienced by the drivers of vehicles in front and at the same time improve distant visibility for the driver.

Figure 2:
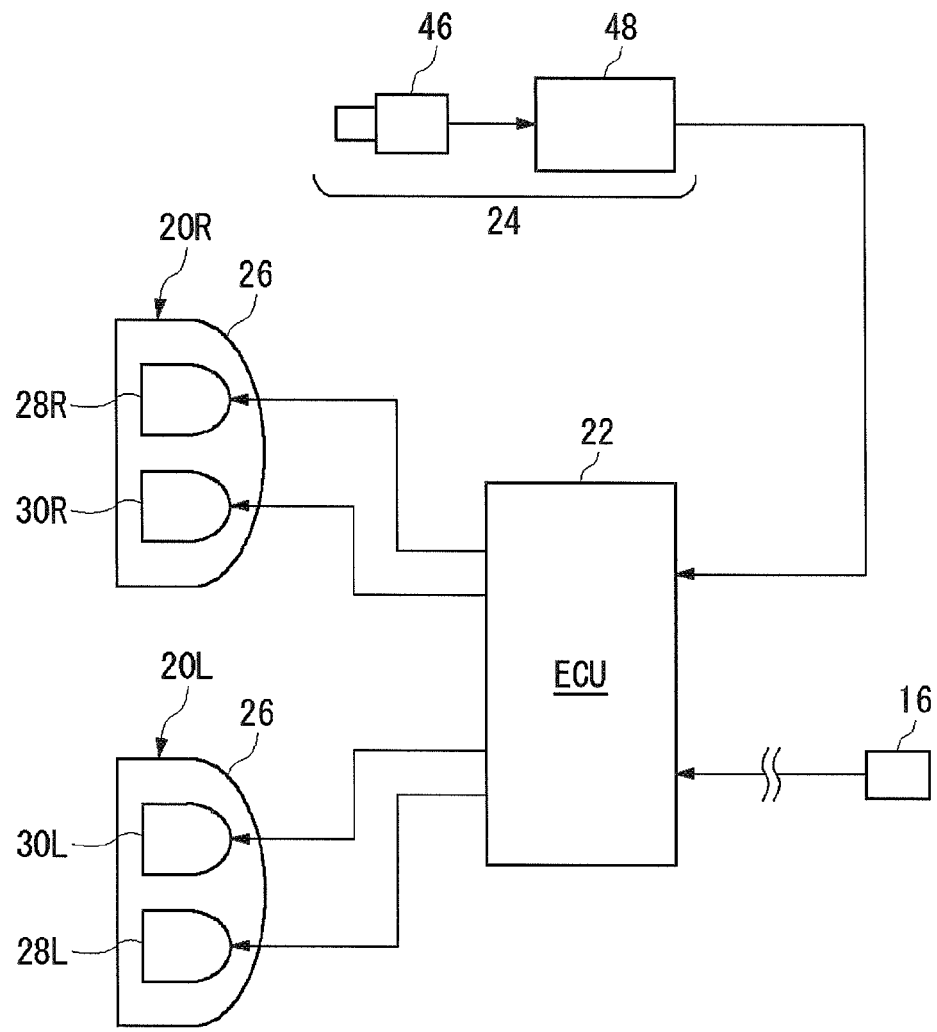
FIG. 2 is a block diagram showing schematically a structure of a headlamp apparatus according to an embodiment of the present invention.

FIG. 2 is a block diagram showing schematically a structure of a headlamp apparatus according to the present embodiment. A pair of headlamp units 20R and 20L are connected to a headlamp controller (ECU) 22. The headlamp controller 22 is connected to a lamp mode selector switch 16 by way of a vehicle controller 18 and carries out a selection control among upper beam, lower beam, and shaded upper beam according to a selected lamp mode conveyed by a signal sent from the lamp mode selector switch 16.

Though not shown in FIG. 1, the front part of the vehicle 10 is provided with a forward vehicle detecting means 24 which is capable of detecting the position of a vehicle in front and the distance thereof from the driver's vehicle 10. Note here that vehicles traveling in front include preceding (forerunning) vehicles traveling ahead in the same direction as the driver's vehicle and oncoming (approaching) vehicles traveling in the opposite direction. The headlamp controller 22 controls the light distribution pattern formed by the headlamp units 20R and 20L based on a detection output from the forward vehicle detecting means 24. The headlamp units 20R and 20L are of identical structure except that the internal structures thereof are bilaterally symmetrical to each other. A lower beam lamp unit 28R and an upper beam lamp unit 30R are disposed in a right-hand lamp housing 26R, and a lower beam lamp unit 28L and an upper beam lamp unit 30L are disposed in a left-hand lamp housing 26L.

Now a description will be given of headlamp units of an automotive headlamp apparatus. The above-described headlamp units 20R and 20L are of identical structure except that the internal structures thereof are bilaterally symmetrical to each other. In the following description, therefore, the right-hand headlamp unit 20R will be explained as an example, and the description of the left-hand headlamp unit 20L will be omitted.

Figure 3:
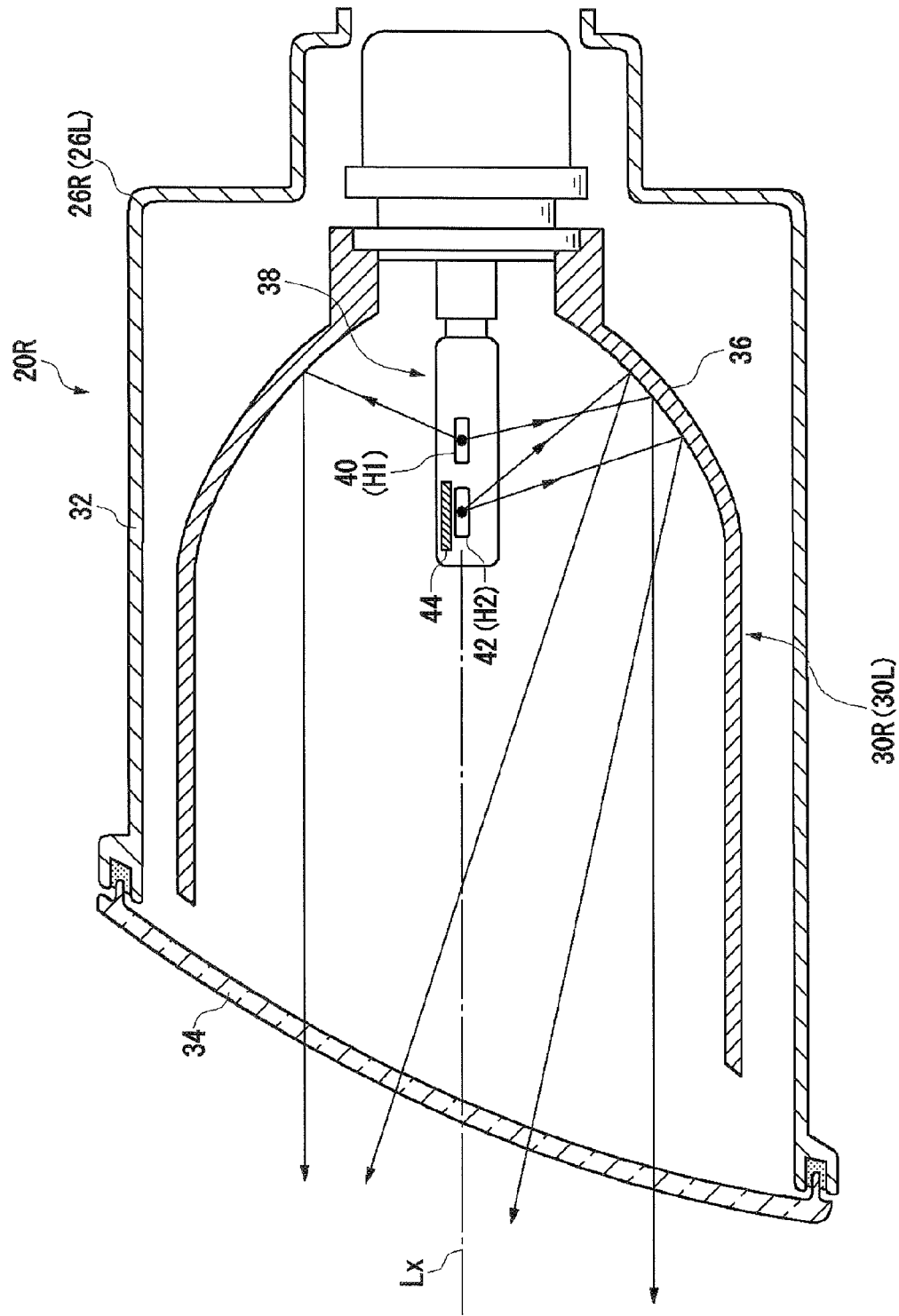
FIG. 3 is a cross-sectional view schematically showing an upper beam lamp unit of a headlamp unit and its vicinity.
Figure 4A:
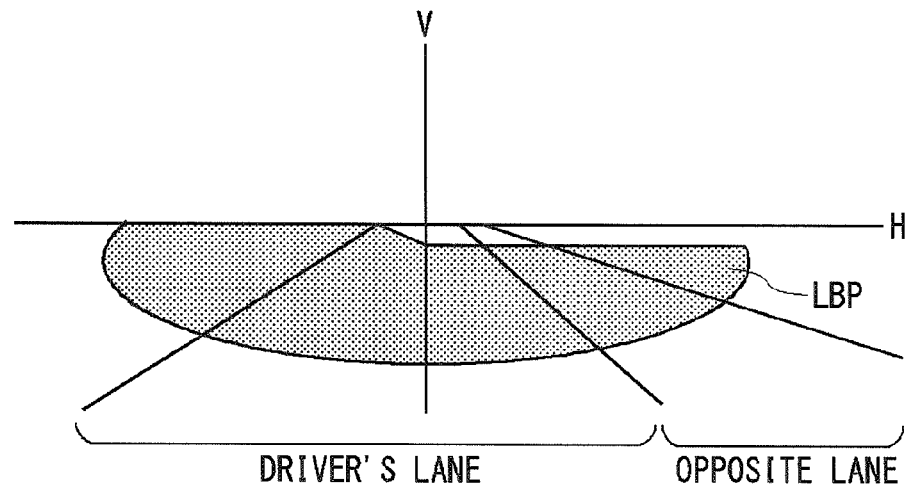
FIG. 4A is a diagram showing a light distribution pattern produced by a lower beam lamp unit.
Figure 4B:
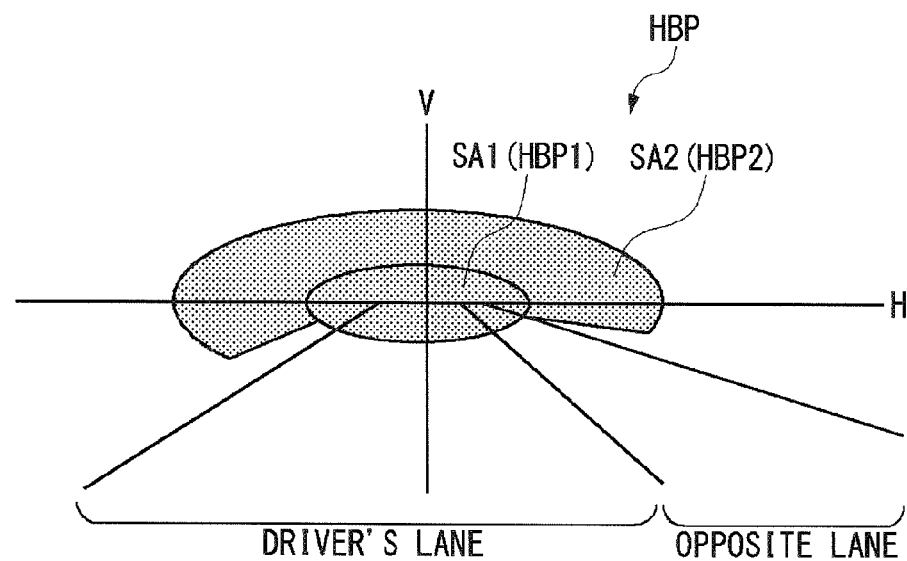
FIG. 4B is a diagram showing a light distribution pattern produced by an upper beam lamp unit.

FIG. 3 is a cross-sectional view schematically showing an upper beam lamp unit of the headlamp unit and its vicinity. FIG. 4A illustrates a light distribution pattern produced by a lower beam lamp unit, whereas FIG. 4B illustrates a light distribution pattern produced by an upper beam lamp unit. It is clear for those skilled in the art that conventional units may be used as the lower beam lamp units 28R and 28L, and therefore the description of the structure thereof is omitted here. Note, however, that the lower beam lamp units 28R and 28L, when turned on, perform an illumination in a passing beam (lower beam) distribution pattern LBP which illuminates a region immediately before the driver's vehicle as shown in FIG. 4A.

Next, a description will be given of a structure of an upper beam lamp unit 30R of a headlamp unit 20R. Note that the left-hand upper beam lamp unit 30L is of the same structure as that of the right-hand upper beam lamp unit 30R, and therefore the description thereof is omitted here. The lamp housing 26R is comprised of a lamp body 32, which is shaped like a vessel with an opening in front, and a cover 34, which is attached to the front opening of the lamp body 32. The upper beam lamp unit 30R, which is disposed inside the lamp housing 26R, includes a reflector 36, which is formed in a paraboloid (parabola in a cross section as shown in FIG. 3), a light source H1, which is disposed at the focal point of the reflector 36, and a light source H2, which is located a little closer to the front of the vehicle than the light source H1.

Used in the upper beam lamp unit 30R according to the present embodiment is a so-called H4 bulb 38 which has two filaments integrally incorporated therein. An R filament 40 disposed on the rear side of the H4 bulb 38 functions as a light source H1, and an F filament 42 disposed on the front side thereof functions as a light source H2. An inner shade 44 is provided near the surface of the H4 bulb 38 above the F filament 42.

In the headlamp unit 20R, as the R filament 40, which is the light source H1 located at the focal point of the reflector 36, lights up, light reflected by the reflector 36 is emitted in a flux of light substantially parallel to a light axis Lx of the lamp. This creates a light distribution pattern HBP1 to illuminate a first illumination area SA1, which is a both laterally (horizontally) and vertically central region ahead of the driver's vehicle as shown in FIG. 4B. As the F filament 42, which is the light source H2 located closer to the front than the focal point of the reflector 36, lights up, light emitted upward is intercepted by the inner shade 44 and in consequence only the light emitted downward is reflected by the reflector 36 to illuminate forward. Thus, as shown in FIG. 4B, a light distribution pattern HBP2 is formed to illuminate a second illumination area SA2, which is shaped in a semicircular ring present on both lateral sides and vertically upper side of the first illumination area SA1. And these light distribution patterns HBP1 and HBP2 are overlapped together to form an upper beam distribution pattern HBP.

Now the forward vehicle detecting means 24 will be explained in detail. As shown in FIG. 2, the forward vehicle detecting means 24 includes an image pickup camera 46, which uses a solid-state image sensing device such as CCDs or MOS, and an image recognition apparatus 48. The image recognition apparatus 48 performs an image analysis by a signal processing of an image taken by the image pickup camera 46 and thereby recognizes a vehicle-in-front, such as a preceding vehicle or an oncoming vehicle, present within an image pickup range and detects the position of the recognized vehicle-in-front and the distance thereto (inter-vehicular distance). And as a detection signal based on the information on the vehicle-in-front is outputted to the headlamp controller 22, the headlamp controller 22 switches the lighting status, namely, the illumination in an upper beam distribution pattern or lower beam distribution pattern of the headlamp units 20R and 20L based on the detection signal. Note that the forward vehicle detecting means 24 may be any other means, such as a millimeter wave radar or a GPS device, as long as it can acquire information on the position of a vehicle in front.

The headlamp controller 22 turns on the headlamp units 20R and 20L by supplying electric power to them when the switch is turned on by the lamp mode selector switch 16. At this time, the turning on and off of the lower beam lamp units 28R and 28L and the upper beam lamp units 30R and 30L is controlled according to the selection status of the lamp mode selector switch 16. In other words, when the lamp mode selector switch 16 is set to the lower beam mode, the lower beam lamp units 28R and 28L only will be turned on for a forward illumination in a lower beam distribution pattern. And when the lamp mode selector switch 16 is set to the upper beam mode, both the lower beam lamp units 28R and 28L and the upper beam lamp units 30R and 30L will be turned on simultaneously for a forward illumination in an upper beam distribution pattern.

When the lamp mode selector switch 16 is set to the shaded upper beam mode, and provided that the position of the vehicle-in-front meets predetermined conditions, a forward illumination in a shaded upper beam distribution pattern, as will be described later, will be performed by the turning on and off of the lower beam lamp units 28R and 28L and the upper beam lamp units 30R and 30L according to the detection signal from the forward vehicle detecting means 24. Further, the headlamp controller 22 is so configured as to be able to independently control the timing of turning on and off with the supply and cutoff of electric power to the light source H1 and the light source H2 especially in the control of turning on and off of the upper beam lamp units 30R and 30L. Also, it is so arranged that the supply and stop of electric power can be performed over predetermined lengths of time such that the brightness of the light source H1 and the light source H2 can be raised or lowered gradually.

(Shaded Upper Beam Mode)

Now the shaded upper beam mode will be explained briefly. FIGS. 5A to 5D show examples of upper beam distribution patterns. Normally, the driver obtains a visibility of the foreground by appropriately using an upper beam in consideration of the road condition, the presence of any vehicle or vehicles in front, the distance to them, and the like. An upper beam, however, has a high intensity of light in the center which can give glare to the drivers of vehicles quite far from the driver's vehicle. This problem has thus far led to an infrequent use of the upper beam even when vehicles in front are present much farther than the distance of several tens of meters which can be illuminated by a lower beam.

As shown in FIG. 5A, the simplest and most common upper beam distribution pattern is an elliptical light distribution pattern. In an upper beam distribution pattern like that, which has an elliptical shape long in the lateral direction, a region above an H line (upper beam region) is illuminated by the headlamps to ensure a visibility of the road ahead of the vehicle. This has had an effect of lowering the frequency of use of the upper beam when there are vehicles in front of the driver's vehicle.

To solve this problem, the inventor has conceived a "shaded upper beam" by adding some devices to an upper beam distribution pattern, thereby realizing both distant visibility for the driver and reduction of glare as experienced by drivers of other vehicles in front. The shaded upper beam is an illumination created by making a partial region of an upper beam distribution pattern as shown in FIG. 5A non-illuminated. For example, a shaded upper beam with the first illumination area SA1 non-illuminated (shaded) as shown in FIG. 4B can be formed by turning off the light sources H1 in the upper beam lamp units 30 of the above-described automotive headlamp apparatus 12. The upper beam distribution pattern in this case is a doughnut-shaped light distribution pattern as shown in FIG. 5B. In addition to this, a concave light distribution pattern, as shown in FIG. 5C, may, for instance, be formed by making the middle portion of the upper beam region of an upper beam distribution pattern non-illuminated (shaded). Also, a one-sided light distribution pattern, as shown in FIG. 5D, may be formed by making one side of the upper beam region non-illuminated (shaded).

With headlamp units capable of forming a shaded upper beam such as described above, the driver, who used to be required to drive with a lower beam because of the presence of vehicles in front, can keep on driving his/her vehicle with a shaded upper beam on as long as the vehicles in front remain within the non-illuminated region (shaded region) of the upper beam distribution pattern. Therefore, in a drive with a shaded upper beam on, a wider foreground than at least the one in a drive at a lower beam can be illuminated, which improves distant visibility (early discovery of pedestrians and fallen objects on the road, road shoulder, sidewalk, etc.) for the driver while suppressing glare to the drivers of vehicles in front.

To realize positive use of such shaded upper beams, it is desired that determination of the presence of vehicles-in-front in a shadable region of an upper beam distribution pattern and formation of the shaded region be carried out with accuracy. In the following description, the control of shaded upper beams will be discussed in detail.

(Position of a Vehicle in Front)

Figure 6A:
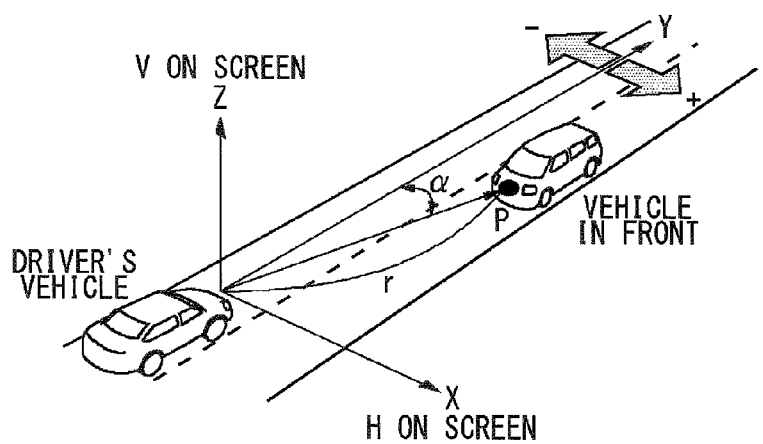
FIG. 6A is a perspective view schematically showing a positional relationship between a driver's vehicle and a vehicle-in-front which is an oncoming vehicle in this case.
Figure 6B:
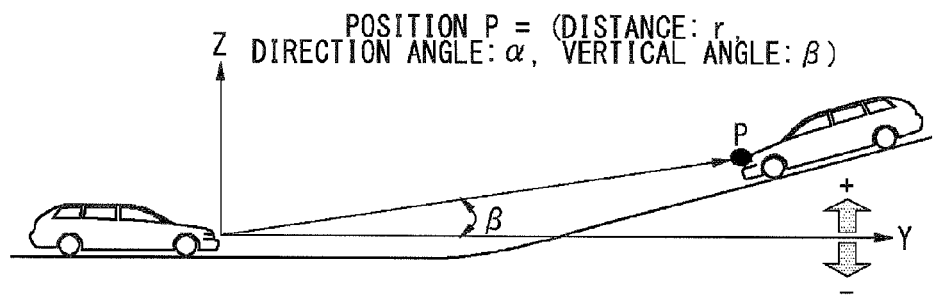
FIG. 6B is a side view schematically showing a positional relationship between a driver's vehicle and a vehicle in front (oncoming vehicle)

In controlling a shaded upper beam, it is necessary to digitize the position of a vehicle-in-front from the information of detection by the forward vehicle detecting means 24. Therefore, a description is given of the digitizing of the position of a vehicle-in-front first. FIG. 6A is a perspective view schematically showing a positional relationship between the driver's vehicle and a vehicle-in-front which is an oncoming vehicle in this case. FIG. 6B is a side view schematically showing a positional relationship between the driver's vehicle and a vehicle in front (oncoming vehicle).

As shown in FIG. 6A and FIG. 6B, the position P of the oncoming vehicle can be defined by three values, which are the distance r to the driver's vehicle, the horizontal direction angle $\alpha$ from the light axis direction in front of the driver's vehicle, and the vertical direction angle $\beta$ from the light axis direction in front of the driver's vehicle. The horizontal direction angle $\alpha$ is determined with the driver's lane side (left) of the Y axis in front of the driver's vehicle (V-V line on the screen) designated as the minus side and the opposite lane side (right) thereof as the plus side. The vertical directional angle $\beta$ is determined with the upper side of the X axis in front of the driver's vehicle (H-H line on the screen) designated as the plus side and the lower side thereof as the minus side. Note that the position P may be represented by a rectangular coordinate system of (X, Y, Z) instead of a polar coordinate system like this. In the present embodiment, however, a polar coordinate system of (r, $\alpha$, $\beta$) is used to represent the position P for ease of handling.

Strictly speaking, an oncoming vehicle as viewed from the driver's vehicle is not a point but a plane having a certain breadth. However, since a shaded upper beam functions in a range of about 20 to 1,000 meters of distance between the driver's vehicle and an oncoming vehicle (vehicle in front), the position P of the oncoming vehicle (vehicle in front) is represented as a point in polar coordinates, and the values corresponding to the area thereof are represented by the correction values of horizontal margin angle $\alpha_m$ and vertical margin angle $\beta_m$. The detail of the horizontal margin angle $\alpha_m$ and the vertical margin angle $\beta_m$ will be discussed later. Also, it is to be noted that the oncoming vehicle (vehicle in front) may include not only four-wheeled vehicles but also a motorcycle, bicycle, and the like.

(Measuring Area for a Vehicle in Front)

Figure 7A:
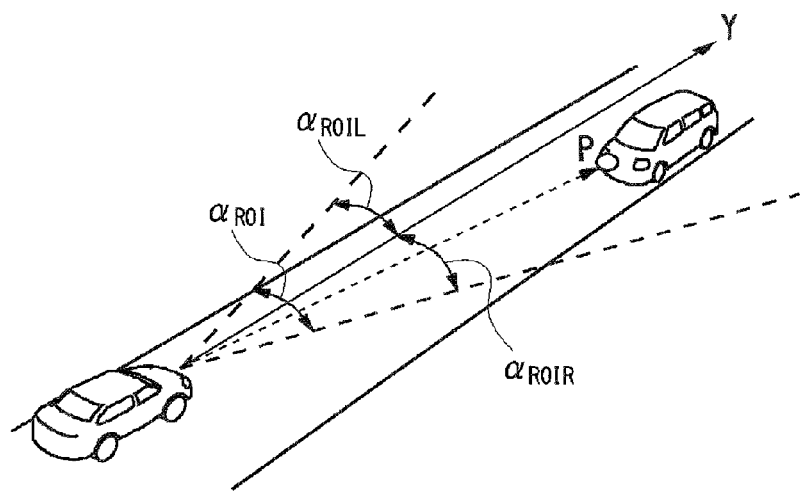
FIG. 7A is a perspective view schematically showing a horizontal measuring area for a vehicle in front which is an oncoming vehicle in this case.
Figure 7B:
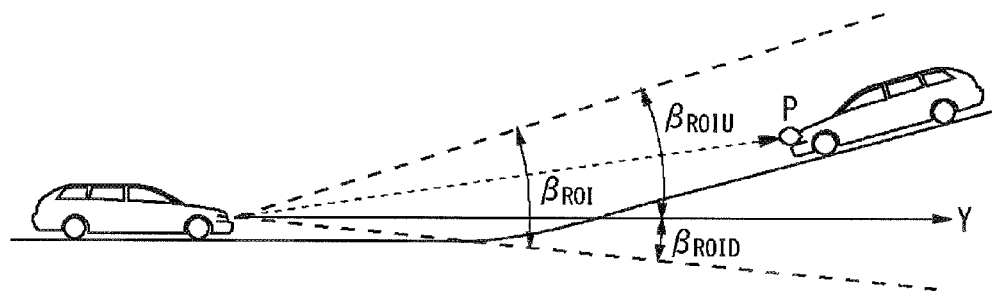
FIG. 7B is a side view schematically showing a vertical measuring area for a vehicle in front (oncoming vehicle)

Now a description will be given of the measuring range for the point P of a vehicle in front to be measured by the forward vehicle detecting means 24. FIG. 7A is a perspective view schematically showing a horizontal measuring region for a vehicle-in-front which is an oncoming vehicle in this case. FIG. 7B is a side view schematically showing a vertical measuring region for a vehicle in front (oncoming vehicle).

As shown in FIG. 7A, let $\alpha_{ROI}$ be a horizontal measuring range for an oncoming vehicle, then $\alpha_{ROI}=\alpha_{ROIR}-\alpha_{ROIL}$. Here, $\alpha_{ROIR}$ is a detection angle on the right-hand side of the vehicle's forward direction, whereas $\alpha_{ROIL}$ is a detection angle on the left-hand side thereof. Likewise, let $\beta_{ROI}$ be a vertical measuring range for an oncoming vehicle, then $\beta_{ROI}=\beta_{ROIU}-\beta_{ROID}$. Here, $\beta_{ROIU}$ is a detection angle on the upper side of the vehicle's forward direction, whereas $\beta_{ROID}$ is a detection angle on the lower side thereof. In the present embodiment, a spatial area encompassed by $\alpha_{ROI}$ and $\beta_{ROI}$ is designated as a "measuring area", which is represented by $(\alpha_{ROI}, \beta_{ROI})$.

The measuring area $(\alpha_{ROI}, \beta_{ROI})$ is set in consideration of the performance of the upper beam lamp units 30 in the headlamp units 20 and the forward vehicle detecting means 24. In the present embodiment, the automotive headlamp apparatus 12, when it determines the absence of any vehicle-in-front in the measuring area based on the result of detection by the forward vehicle detecting means 24, performs control such that the road ahead is illuminated with an ordinary upper beam and not with a shaded upper beam. This further improves the visibility of the road ahead for the driver.

Next, a description is given of the reasons and advantageous effects of providing a measuring area as described above. The area that can be illuminated with an upper beam is limited, and the illuminated area can vary with the performance of an upper beam by the lamp units, depending, for instance, on whether the light source of the upper beam lamp units is a halogen bulb or a xenon bulb. Hence, if the measuring area is set according to the illumination performance by an upper beam, it will be possible to exclude from the measurement the vehicles in front that are not subject to the glare from the upper beam. Also, if a vehicle in front detected by the forward vehicle detecting means 24 is outside the measuring area, then the vehicle, too, can be excluded from further arithmetic processings, thus reducing the computation load on the vehicle controller 18 and the headlamp controller 22.

Note that where the light axis of the upper beam lamp units is capable of swiveling, the position P of a vehicle in front is represented using the light axis direction after a swivel as the forward direction of the driver's vehicle. In such a case, the measuring area also shifts as much as a swivel angle θ. Also, in the present embodiment, the use of the light axis direction as the forward direction of the driver's vehicle allows a uniform representation of the position P of a vehicle-in-front regardless of swivel capability, and this simplifies computation in the control of a shaded upper beam.

(Determination of Vehicle Existent Area)

Figure 8:
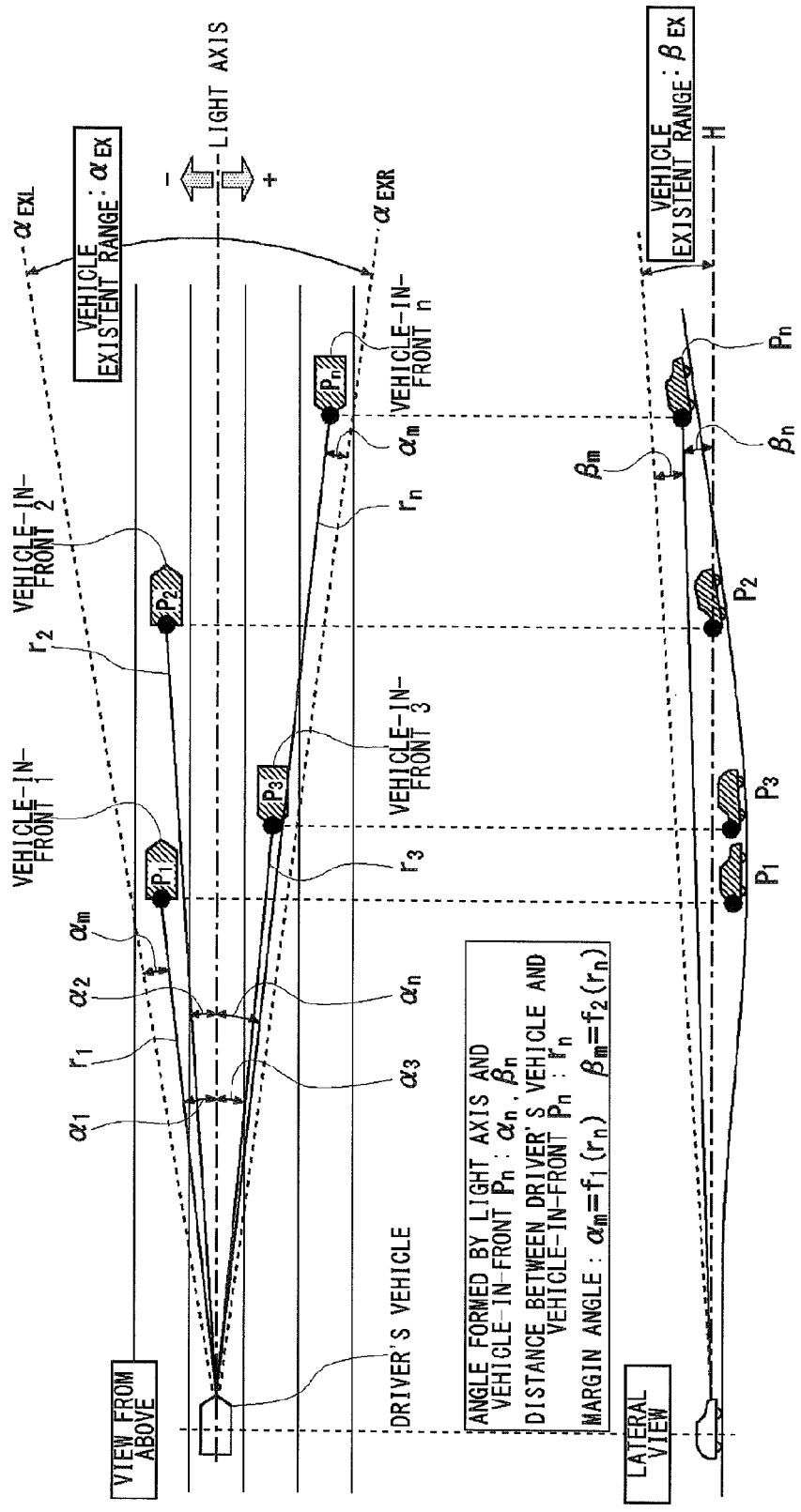
FIG. 8 is a schematic illustrations showing a positional relationship between a driver's vehicle and vehicles-in-front viewed from above and viewed from a side, and a relationship between those vehicles and vehicle existent ranges.

Now a method for determining a vehicle existent area will be explained. Here a "vehicle existent area" (vehicle existent range) means a virtual area calculated from the positions of vehicles in front of the driver's vehicle. FIG. 8 is a schematic illustrations showing a positional relationship between a driver's vehicle and vehicles-in-front viewed from above and viewed from a side, and a relationship between those vehicles and vehicle existent ranges.

The headlamp controller 22 according to the present embodiment calculates the respective positions $P_n$ of vehicles in front existing within a measuring area predefined before the driver's vehicle based on the information of detection by the forward vehicle detecting means 24 and determines the existent ranges $\alpha_{Ex}$ and $\beta_{Ex}$, which contain all the positions $P_n$, as the vehicle existent areas. Here, the vehicle existent range is $\alpha_{Ex}=\alpha_{ExR}-\alpha_{ExL}$, and the right-hand vehicle existent angle $\alpha_{ExR}$ is defined as an angle corresponding to the position $P_n$ of the rightmost vehicle in front as seen from the driver's vehicle, and the left-hand vehicle existent angle $\alpha_{ExL}$ is defined as an angle corresponding to the position $P_1$ of the leftmost vehicle in front as seen from the driver's vehicle. Note that $\alpha_{ExR}$ is a positive value and $\alpha_{ExL}$ is a negative value.

If the headlamp controller 22 determines that the entirety of the determined vehicle existent area is contained in the shaded region as shown in FIGS. 5B to 5D or the first illumination area SA1 as shown in FIG. 4B, for instance, then the headlamp controller 22 will control the headlamp units 20 in such a manner as to make the shaded region or the first illumination area SA1 non-illuminated. This allows an improvement on distant visibility for the driver, while reducing the glare to the drivers of vehicles in front, by maintaining illumination in an upper beam distribution pattern in the upper beam region other than the shaded region as shown in FIGS. 5B to 5D or the first illumination area SA1 as shown in FIG. 4B.

On the other hand, when at least a part of the determined vehicle existent area is contained in the region of an upper beam distribution pattern other than the shaded region or the first illumination area SA1 (e.g., the second illumination area SA2 as shown in FIG. 4B), the headlamp controller 22 controls the headlamp units 20 in such a manner as not to form any upper beam distribution pattern. This will reliably prevent glare to the drivers of vehicles in front.

Also, even when the entirety of the determined vehicle existent area is contained in the shaded region, the headlamp controller 22 according to the present embodiment forcibly controls the headlamp units 20 in such a manner as not to form an upper beam distribution pattern if there exists a vehicle closer to the driver's vehicle than a first threshold value (e.g., 20 m if the vehicle in front is a preceding vehicle). Ideally speaking, when the entirety of the vehicle existent area is contained in the shaded region or the like of an upper beam distribution pattern, it is possible to keep driving the vehicle with the upper beam distribution pattern on by making the shaded region non-illuminated. However, with a vehicle-in-front close to the driver's vehicle, the position of the vehicle-in-front can vary greatly with time, and it is quite probable that the control of making the shaded region non-illuminated cannot keep pace with it. Therefore, when there exists a vehicle closer in comparison to the driver's vehicle than the first threshold value, the headlamp controller 22 forcibly controls the headlamp units 20 to illuminate in a lower beam distribution pattern only without forming an upper beam distribution pattern. This will reliably prevent glare to the driver of the vehicle in front.

The headlamp controller 22 according to the present embodiment does not consider a vehicle in front as one if the distance of the vehicle to the driver's vehicle is greater in comparison than a second threshold value (e.g., 200 to 500 m if the vehicle in front is a preceding vehicle). That is, the headlamp controller 22 does not use information on the position of a vehicle-in-front farther in comparison than the second threshold value, even when it has received it, in the computation for determining a vehicle existent area. It is because a vehicle far enough from the driver's vehicle is least likely to suffer from the glare therefrom even if it is included in the determination of the vehicle existent area. Inclusion of the region where the distant vehicle exists in the shaded region may not allow a drive with an upper beam distribution pattern on, which in turn proves undesirable from the viewpoint of improving visibility of the road ahead. Therefore, this scheme of not considering a vehicle in front more distant than the second threshold value as a vehicle in front can increase the circumstances for a drive with an upper beam distribution pattern on.

When the vehicle in front is an oncoming one, the headlamp controller 22 controls the headlamp units 20 in such a manner as not to form an upper beam distribution pattern provided that the oncoming vehicle is closer in comparison to the driver's vehicle than a third threshold value, which is larger than the aforementioned first threshold value (when the vehicle in front is a preceding vehicle). When the vehicle in front included in the vehicle existent area is an oncoming vehicle traveling in the opposite direction, the position of the approaching vehicle can vary greatly with time in comparison to the vehicle traveling ahead in the same direction as the driver's vehicle, and the control of making a partial region of the upper beam distribution pattern non-illuminated becomes proportionately difficult. Therefore, when the vehicle in front is an oncoming vehicle, the formation of an upper beam distribution pattern is controlled through comparison of the distance of the oncoming vehicle against the third threshold value, which is larger than the aforementioned first threshold value. As a result, the formation of an upper beam distribution pattern can be stopped at an earlier stage of the approach of the oncoming vehicle, thereby reliably preventing glare on the driver of the oncoming vehicle.

When the vehicle in front is an oncoming one, the headlamp controller 22 does not consider the vehicle-in-front as one if the distance of the vehicle to the driver's vehicle is greater in comparison than a fourth threshold value, which is larger than the aforementioned second threshold value (when the vehicle in front is a preceding vehicle). Here, the second threshold value is selected from 200 to 500 m as a value when the vehicle in front is a preceding vehicle. And the fourth threshold value is selected from 300 to 1,000 m as a value when the vehicle in front is an oncoming vehicle. An oncoming vehicle far enough from the driver's vehicle is least likely to suffer from the glare therefrom even if it is included in the determination of the vehicle existent area. Inclusion of the region where the distant oncoming vehicle exists in the shaded region may not allow a drive with an upper beam distribution pattern on, which in turn proves undesirable from the viewpoint of improving visibility of the road ahead for the driver. Yet, oncoming vehicles come under a greater effect of glare from an upper beam distribution pattern than preceding vehicles. Therefore, the scheme of not considering an oncoming vehicle more distant in comparison than the fourth threshold value, which is larger than the aforementioned second threshold value, as a vehicle in front can increase the circumstances for a drive with an upper beam distribution pattern on while reducing glare on the oncoming vehicle.

It should be understood that the headlamp controller 22 can execute the control of a shaded upper beam with greater accuracy when the first threshold value and the third threshold value are used for preceding vehicles and when the second threshold value and the fourth threshold value are used for oncoming vehicles. In this case, the relationship of the above-mentioned threshold values with each other is: (first threshold value)<(second threshold value), (third threshold value)<(fourth threshold value), and (second threshold value)<(fourth threshold value). Appropriate values may be chosen for the respective threshold values, depending on the structure of upper beam lamp units and the type of light source used therefor.

(Determination of Threshold Values According to the Relative Speed)

When the first threshold value is used for a preceding vehicle or when the third threshold value is used for an oncoming vehicle, the first threshold value or the third threshold value is determined according to the relative speed between the driver's vehicle and the vehicle in front. For example, when an oncoming vehicle and the driver's vehicle pass each other, the faster the relative speed, which is the sum of the speeds of the driver's vehicle and the oncoming vehicle, is and the closer the inter-vehicular distance is, the greater the change of angle $\alpha_n$ per unit time (d $\alpha_n$/dt) will be. Here, the angle $\alpha_n$ is an angle formed between the straight line interconnecting the two vehicles and their travel direction. At this time, there arises a possibility of the driver of the oncoming vehicle experiencing glare because the control of a shaded upper beam and/or a normal upper beam cannot keep pace with the change due to such limitations as the measuring capacity of the forward vehicle detecting means 24, the computation capacity of the headlamp controller 22, and the structure of the upper beam lamp units 30. Even when the control of a shaded upper beam and a normal upper beam keeps pace with the change, there is a possibility of the switching of the light distribution pattern giving a sense of discomfort to the driver of his/her own vehicle. Therefore, compared with the case where the first threshold value and the third threshold value are fixed, the determination of the first threshold value and the third threshold value for switching to a lower beam according to the relative speed between the driver's vehicle and the vehicle in front can realize the control of a shaded upper beam without giving glare to the driver of the vehicle in front or a sense of discomfort to the driver of his/her own vehicle.

Figure 9A:
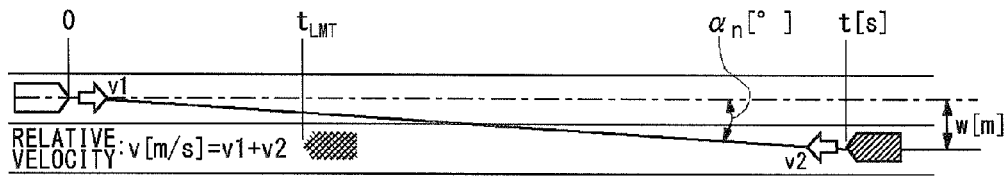
FIG. 9A is a schematic illustration showing a driver's vehicle and a vehicle in front passing each other as viewed from above.
Figure 9B:
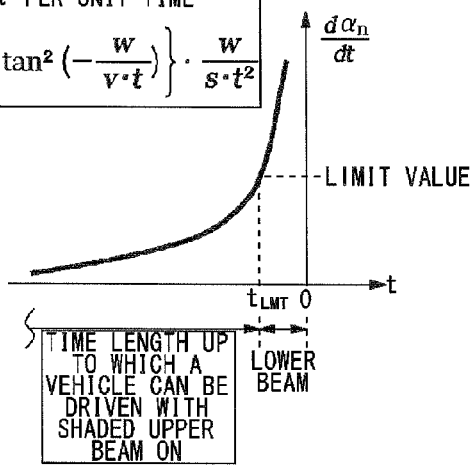
FIG. 9B is a graph showing a relationship between a change per unit time of angle and time up to a point of passing each other in a situation as shown in FIG. 9A.
Figure 9C:
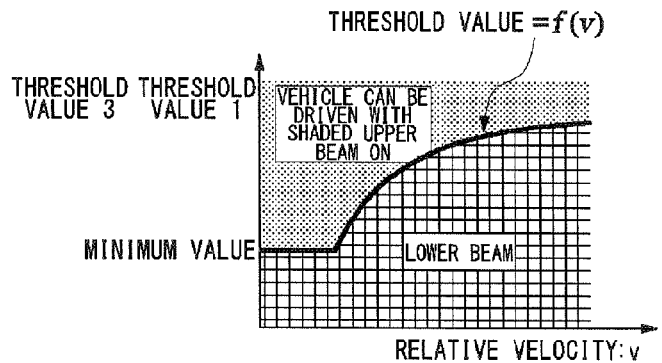
FIG. 9C is a graph showing a relationship between relative speed and each threshold value.

Next, a method for determining the first threshold value and the third threshold value according to the relative speed between the driver's vehicle and the vehicle in front will be discussed in detail. FIG. 9A is a schematic illustration showing the driver's vehicle and a vehicle in front passing each other as viewed from above. FIG. 9B is a graph showing a relationship between the change per unit time of angle $\alpha_n$ and the time up to the point of passing each other in a situation as shown in FIG. 9A. FIG. 9C is a graph showing a relationship between the relative speed and the respective threshold values.

As described above, the faster the relative speed between the driver's vehicle and the vehicle in front is and the closer the inter-vehicular distance is, the greater the change per unit time of angle $\alpha_n$ formed between the two vehicles or the vehicle existent ranges $\alpha_{Ex}$ and $\beta_{Ex}$ as shown in FIG. 8 will be. Therefore, discussed below is a specific example of determining the first threshold value and the third threshold value according to this increase in the rate of change. Note that the relative speed is given in positive values in the direction of the vehicle-in-front approaching the driver's vehicle.

In the present embodiment, attention is directed to the increasing change (d $\alpha_n$/dt) per unit time of angle $\alpha_n$ formed between the driver's vehicle and the vehicle in front. That is, it is so arranged that the headlamp controller 22 calculates a limit time $t_{LMT}$ at which (d $\alpha_n$/dt) exceeds a limit value and determines distances (first threshold value and third threshold value) where the limit time $t_{LMT}$ is not exceeded according to the relative speed. Here, the "limit value" of (d $\alpha_n$/dt) means a value predetermined from the structure of upper beam lamp units, the processing capacity of the headlamp controller 22, and the like in consideration of such values as free the driver from a sense of discomfort or displeasure at the presence of a shaded region or allow the control of the shaded region to keep pace.

FIG. 9A illustrates a situation in which the driver's vehicle and an oncoming vehicle pass each other. The angle $\alpha_n$ between the oncoming vehicle and the forward direction of the driver's vehicle is given by $\alpha_n = \tan^{-1}(w/d)$, where d is the distance from the driver's vehicle to the oncoming vehicle. Then the change ($d\alpha_n/dt$) of the angle $\alpha_n$ per unit time is obtained by differentiating it with respect to time. The ($d\alpha_n/dt$) thus obtained and the time t up to the point of the two vehicles passing each other have a relationship as shown in FIG. 9B. The horizontal axis of the graph in FIG. 9B represents the time up to the two vehicles passing each other in negative values until t=0 where they pass each other.

In the relationship shown in FIG. 9B, the limit time $t_{LMT}$ is calculated by setting a limit value for ($d\alpha_n/dt$). Based on the value of limit time $t_{LMT}$ thus calculated, the headlamp controller 22 performs such control as to enable a shaded upper beam illumination if it is before the limit time $t_{LMT}$ and switch to a lower beam illumination if it is past the limit time $t_{LMT}$.

With the limit time $t_{LMT}$ calculated, the distance d between the two vehicles, namely, the first threshold value and the third threshold value, can be obtained as a function of the relative speed (see FIG. 9C). For example, in a situation where two vehicles pass each other under conditions of relative speed v=200 km/h (55.6 m/s) and lane width w=3.5 m, the limit time will be $t_{LMT} \approx 0.85$ [sec] if the limit value of ($d\alpha_n/dt$) is set at 5 [degrees/s] in consideration of the structure of upper beam lamp units, the processing capacity of the headlamp controller 22, and the like. As a result, the third threshold value is calculated as 0.85 55.6≈47 [m]. In other words, under conditions of relative speed v=200 km/h and lane width w=3.5 [m], the headlamp controller 22 will forcibly switch the illumination to a lower beam when the two vehicles approach each other closer than 47 meters.

In consideration of cases where the vehicle in front exists directly opposite to the driver's vehicle ($\alpha$=0 degrees) or where the relative speed is small, there are minimum values set for the first threshold value and the third threshold value as shown in FIG. 9C. This arrangement enables forcible switching to a lower beam at close range. Also, with functions as mentioned above mapped, the first threshold value and the third threshold value can be calculated without complex computation, so that the control load of the headlamp controller 22 can be lightened.

(Threshold Coefficient According to Facing Angle)

When a second threshold value is used for a preceding vehicle and when a fourth threshold value is used for an oncoming vehicle, the second threshold value and the fourth threshold value are corrected according to a facing angle $\omega_n$, which is an angle formed between the light axis of the driver's vehicle and the traveling direction of the vehicle in front. It is to be noted here that the threshold value is corrected according to the facing angle $\omega_n$ because the intensity of glare as experienced by the drivers of vehicles in front varies with the facing angle $\omega_n$. To be more specific, the intensity of glare as experienced by the driver of a vehicle in front is the greatest when the vehicle in front is running in a direction parallel to that of the driver's vehicle (facing angle $\omega_n$=0), and it will decrease as the facing angle $\omega_n$ of the vehicle in front becomes larger.

Suppose that there is a road ahead which intersects at right angles the road on which the driver's vehicle is currently running and a vehicle is now running on the intersecting road. In such a situation, the vehicle on the intersecting road, even if it is at the position P inside the aforementioned vehicle existent ranges $\alpha_{Ex}$ and $\beta_{Ex}$, will be little affected by the glare of an upper beam from the driver's vehicle. Hence, it is desirable that such vehicles in front be not included in the vehicle existent range. However, since there may be roads intersecting not just at right angles but at other angles, it is necessary to determine whether to include a vehicle ahead in the vehicle existent range or not according to its traveling direction relative to the driver's vehicle. Thus, a distance coefficient R is set or predefined and the second threshold value and the fourth threshold value are multiplied by the distance coefficient R in a correction to make both of the threshold values smaller depending on the situation. That is, the larger the facing angle of a vehicle-in-front, the harder it will be for the vehicle-in-front to be included in the vehicle existent range.

Figure 10A:
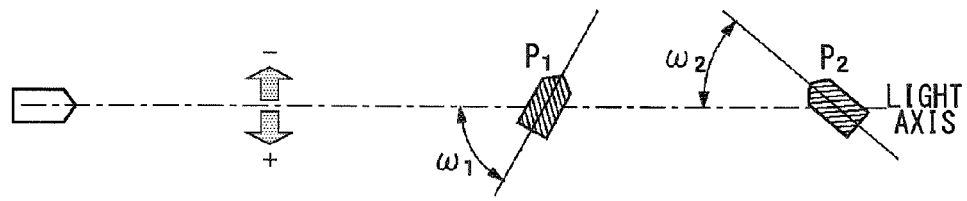
FIG. 10A is a schematic illustration showing a facing angle between a driver's vehicle and a vehicle in front as viewed from above.
Figure 10B:
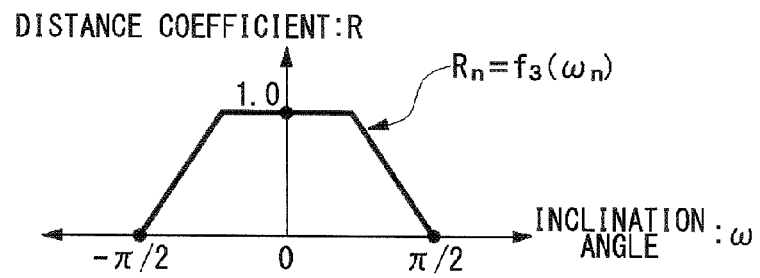
FIG. 10B is a graph showing a relationship between a facing angle and a distance coefficient.

FIG. 10A is a schematic illustration showing the facing angle between the driver's vehicle and a vehicle in front as viewed from above. FIG. 10B is a graph showing a relationship between the facing angle and the distance coefficient.

As shown in FIG. 10A, facing angles $\omega_1$ and $\omega_2$ represent angles formed between the light axis of the driver's vehicle and the traveling directions of vehicles-in-front at positions $P_1$ and $P_2$, respectively. And, as shown in FIG. 10B, a function $f_3$ is predefined or set to determine the distance coefficient R according to the measure of the facing angle $\omega$. Also, a vehicle-in-front whose facing angle $\omega=\pm(\pi/2)$ cannot be distinguished between a preceding vehicle and an oncoming vehicle. However, where a vehicle in front running at right angles to the light axis of the driver's vehicle is to be excluded from the vehicle existent range, a function for which the distance coefficient R when facing angle $\omega=\pm(\pi/2)$ is set to 0 is used. Conversely, where it should not be excluded from the vehicle existent range, a function for which the distance coefficient R when facing angle $\omega=\pm(\pi/2)$ is set to a value other than 0 is used. Note that when the facing angle cannot be measured or when the control does not take the facing angle into consideration, the distance coefficient R may be fixed at 1. The facing angle may be calculated from the time variation of the position of a vehicle-in-front, based on GPS or millimeter wave radar information, for instance.

(Hysteresis Characteristics)

The switching of the light distribution pattern may take place frequently if a number of vehicles in front move away or closer at the distances near the aforementioned threshold values. Even when the distance between the driver's vehicle and a vehicle in front is constant, the switching of the light distribution pattern may occur frequently due to the reversal of the magnitude relation between the threshold value and the distance resulting from measurement errors or the like. In the present embodiment, therefore, the control is executed using hysteresis characteristics in the comparison of the distance r to the vehicle-in-front and the respective threshold values.

Figure 11:
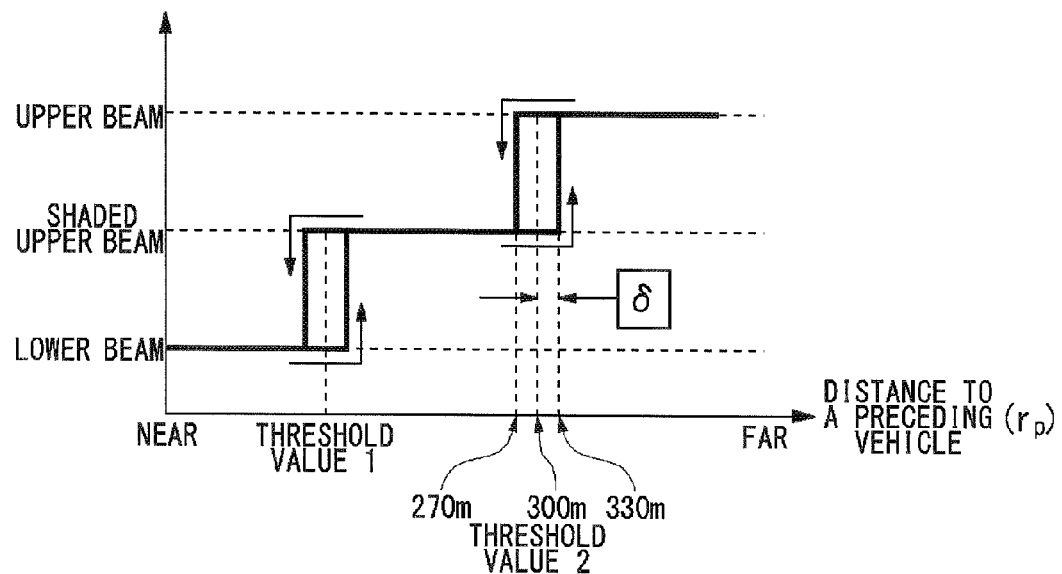
FIG. 11 is a diagram showing hysteresis characteristics in a control according to an embodiment of the present embodiment.

FIG. 11 is a diagram showing hysteresis characteristics in the control according to the present embodiment. As described above, the switching of the light distribution pattern from a lower beam to a shaded upper beam, from a shaded upper beam to a normal upper beam, and the like is controlled based on the results of comparison between the distance to the vehicle-in-front and the threshold value and the results of comparison between the shaded region and the vehicle existent area.

However, there may, for instance, be a situation in which the driver's vehicle is following a single vehicle in front and the distance $r_p$ to the vehicle in front is changing in the neighborhood of a second threshold value. In such a case, there may arise a possibility of frequent switching between a shaded upper beam and a normal upper beam, thus causing displeasure or reduced visibility to both the driver of the illuminating vehicle and the driver of the vehicle in front. To overcome this problem, the present embodiment employs a width ($\delta_1$ to $\delta_4$) for each threshold value. In the example of FIG. 11, where the threshold value 2 and $\delta_2$ are set at 300 m and ±30 m, respectively, the headlamp controller 22 performs a switching from a shaded upper beam to a normal upper beam when the distance $r_p$ to the vehicle in front has reached 330 m after gradually increasing from 200 m. On the other hand, the headlamp controller 22 performs a switching from a normal upper beam to a shaded upper beam when the distance $r_p$ to the vehicle in front has reached 270 m after gradually decreasing from more than 330 m.

In the beam pattern switching control like this, the switching of beams seldom occurs even when the distance to the vehicle-in-front changes near the threshold value, so long as the variation is within ±$\delta$. The value of the width $\delta$ may be determined based on the distance measuring accuracy, actual vehicle test (e.g., sensory evaluation by the driver), and the like. Note also that the value of the width $\delta$ may be set for each threshold value individually or for all of them together.

Similarly, in an extension of such a scheme, the comparison between the shaded region and the vehicle existent area may be controlled by the use of hysteresis characteristics as described above such that the point of switching the light distribution is different between the case where a state of the shaded region contained in the vehicle existent region changes to a state thereof not contained and the opposite case where a state of the shaded region not contained in the vehicle existent region changes to a state thereof contained. Such an arrangement can also prevent the frequent occurrence of beam switching.

(Margin Angles)

Now a description will be given of margin angles which have already been explained briefly. The margin angles are set in consideration of measurement errors in the positions P of vehicles in front, variations in the structure of headlamp units that can affect the light distribution pattern, and the like. As shown in FIG. 8, a vehicle existent range is set larger by a horizontal margin angle $\alpha_m$ and a vertical margin angle $\beta_m$ than the region where the vehicles in front actually exist. This serves to more reliably prevent the glare to the drivers of the vehicles in front. Also, the margin angles are parameters that play the role of overcoming the problem of the "area" (width and height) of the vehicles in front when they are each represented by a point P.

In the light of the foregoing circumstances, the headlamp controller 22 according to the present embodiment determines a vehicle existent area as existent ranges $\alpha_{Ex}$ and $\beta_{Ex}$, which are wider by a predetermined horizontal margin angle $\alpha_m$ and a predetermined vertical margin angle $\beta_m$, respectively, than the basic ranges in which the vehicles in front exist as seen from the driver's vehicle. Then, when the entirety of the vehicle existent area is contained in the shaded region, the headlamp controller 22 controls the headlamp units 20 in such a manner as to make the shaded region non-illuminated. And when at least a part of the vehicle existent area is contained in the region of an upper beam distribution pattern other than the shaded region, the headlamp controller 22 controls the headlamp units 20 in such a manner as not to form any upper beam distribution pattern.

For example, in the case where the boundary of a shaded region capable of being non-illuminated and the boundary of a vehicle existent area are in close proximity to each other, there may be chances of vehicles in front being illuminated by an upper beam distribution pattern, though such should not happen, due to detection errors in the positional information on the vehicles in front, variations in the upper beam distribution pattern resulting from tolerances on the parts of the headlamp units 20, and the like. Nevertheless, the headlamp controller 22 according to the present embodiment can prevent the glare to the drivers of vehicles-in-front reliably because it determines a vehicle existent area based on a corrected range which is wider by predetermined angles than the basic range where the vehicles-in-front exist as seen from the driver's vehicle.

The headlamp controller 22 determines a vehicle existent area based on a vertical vehicle existent range $\beta_{Ex}$, including the basic range, which is enlarged by a predetermined vertical margin angle $\beta_m$ from the vehicles-in-front positioned at ends in the vertical direction. Since a vehicle in front has a spatial breadth in a vertical direction as well, determining a vehicle existent area by assuming the vehicle as a point creates possibilities of placing some vertical portion thereof outside the vehicle existent area. The method for determining the vehicle existent area employed herein, however, prevents some vertical portions of vehicles-in-front from being placed outside the vehicle existent region, thus realizing a highly accurate shaded upper beam control.

Also, the headlamp controller 22 determines a vehicle existent area based on a horizontal vehicle existent area $\alpha_{Ex}$, including the basic range, which is enlarged by a predetermined horizontal margin angle $\alpha_m$ from the vehicles-in-front positioned at ends in the horizontal direction. Since a vehicle in front has a spatial breadth in a horizontal direction as well, determining a vehicle existent area by assuming the vehicle as a point creates possibilities of placing some horizontal portion thereof outside the vehicle existent area. The method for determining the vehicle existent area employed herein, however, prevents some horizontal portions of vehicles-in-front from being placed outside the vehicle existent area, thus realizing a highly accurate shaded upper beam control.

One of the objectives of a shaded upper beam distribution pattern is the prevention of accidents by early discovery of pedestrians and obstacles which may exist in a horizontal direction relative to the driver's vehicle. In this sense, if a horizontal correction range to be added to the basic range in determining a vehicle existent area is too large, there may arise higher possibilities of the entirety of the vehicle existent region not contained in the shaded region capable of being non-illuminated in an upper beam distribution pattern. While this may prevent glare to the drivers of vehicles in front effectively, there is room for further improvements from the viewpoint of early discovery of pedestrians and obstacles. Also, for vehicles, such as buses and trucks, which have higher driver's eye point than ordinary vehicles, it is of greater importance that the occurrence of glare by an upper beam distribution pattern be reduced.

Thus, the headlamp controller 22 according to the present embodiment determines a vehicle existent area based on a vertical existent range $\beta_{Ex}$, including the basic angle, which is enlarged by a vertical margin angle $\beta_m$ from the vehicles-in-front positioned at ends in the vertical direction, and a horizontal correction range $\alpha_m$, including the basic angle, which is enlarged by a horizontal margin angle $\alpha_m$ from the vehicles-in-front positioned at ends in the horizontal direction. Note here that the horizontal margin angle $\alpha_m$ is set smaller than the vertical margin angle $\beta_m$. As a result, in the control of an upper beam distribution pattern with respect to the horizontal positions of vehicles in front, priority is given to the maintenance of illumination of an upper beam distribution pattern over the reduction of glare. And in the control of an upper beam distribution pattern with respect to the vertical positions of vehicles in front, priority is given to the reduction of glare.

In terms of a method of control, a method for controlling an automotive headlamp apparatus according to the present embodiment includes the following steps (1)-(3). That is, the method includes: (1) the step of determining a vehicle existent area for the vehicles traveling ahead of the driver's vehicle; (2) the step of comparing a shaded region capable of being non-illuminated in an upper beam distribution pattern with a vehicle existent area; and (3) the step of controlling the headlamp units in such a manner as not to form an upper beam distribution pattern if there is an overlap between a region other than the shaded region in the upper beam distribution pattern and the vehicle existent area. In the step of determining a vehicle existent area, the vehicle existent area is determined based on a correction range which is wider by predetermined angles than the basic range containing the vehicles-in-front as seen from the driver's vehicle.

For example, in the case where the boundary of a shaded region capable of being non-illuminated and the boundary of a vehicle existent area are in close proximity to each other, there may be instances of vehicles-in-front being illuminated by an upper beam distribution pattern, though such should not happen, due to detection errors in the positional information on the vehicles-in-front, variations in the upper beam distribution pattern resulting from tolerances on the parts of the headlamp units, and the like. However, according to the control method herein, a vehicle existent area is determined to be wider based on a corrected range which is wider by predetermined angles than the basic range where the vehicles-in-front exist as seen from the driver's vehicle are contained, and consequently the glare to the drivers of vehicles-in-front is prevented reliably.

Figure 12:
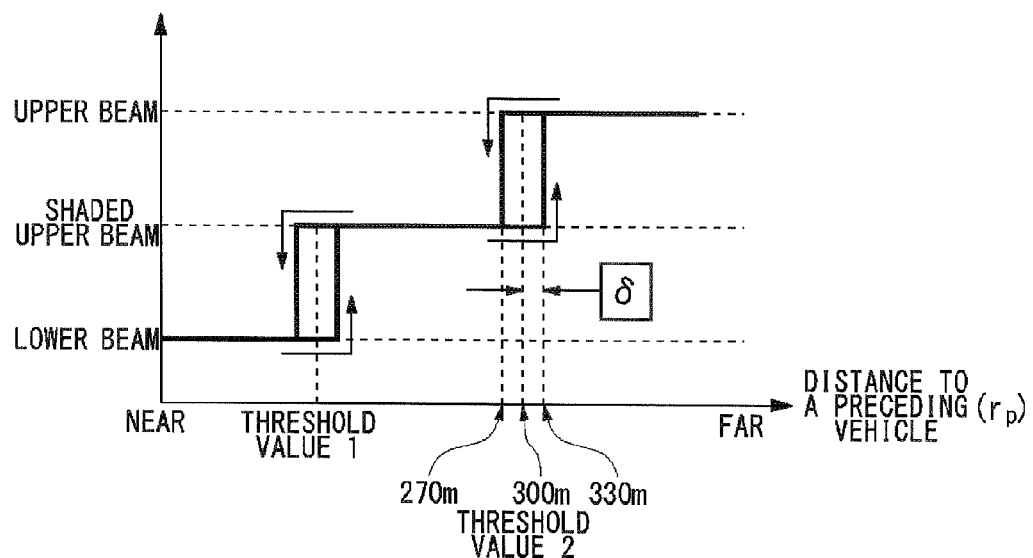
FIG. 12 is a diagram showing a relationship between a distance r to vehicles-in-front and a horizontal margin angle and a vertical margin angle.

FIG. 12 is a diagram showing a relationship between the distance r to the vehicles-in-front and the horizontal margin angle $\alpha_m$ and the vertical margin angle $\beta_m$. As shown in FIG. 12, the values of the horizontal margin angle $\alpha_m$ and the vertical margin angle $\beta_m$ are not constant but change in relation to the distance r to the vehicles in front. The farther the vehicles in front are, the smaller their values are set. This is because the farther the vehicles in front are located, the smaller the image (area) thereof are from the driver's vehicle, and therefore using proportionately smaller margin angles can increase the chances of driving with a shaded upper beam. And this can realize both improved distant visibility for the driver and reduced glare to the drivers of the vehicles in front.

In this manner, the headlamp controller 22 uses the vertical margin angle $\beta_m$ calculated according to the distance between the driver's vehicle and the vehicle in front. As a result, if the vehicle in front is very far, the vehicle existent area can be determined such that no vertical portion thereof is placed outside the vehicle existent area even when the vertical margin angle $\beta_m$ is set small according to the distance. Conversely, if the vehicle in front is close, the vehicle existent area can be determined by setting the vertical margin angle $\beta_m$ large according to the distance in such a manner that no vertical portion thereof is placed outside the vehicle existent region. Thus, compared with the case where the vertical margin angle $\beta_m$ is fixed, both the reduction of glare to the vehicles in front and the improvement of visibility can be achieved quite effectively.

Similarly, the headlamp controller 22 uses the horizontal margin angle $\alpha_m$ calculated according to the distance between the driver's vehicle and the vehicle in front. As a result, if the vehicle in front is very far, the vehicle existent area can be determined such that no horizontal portion thereof is placed outside the vehicle existent area even when the horizontal margin angle $\alpha_m$ is set small according to the distance. Conversely, if the vehicle in front is close, the vehicle existent area can be determined by setting the horizontal margin angle $\alpha_m$ large according to the distance in such a manner that no horizontal portion thereof is placed outside the vehicle existent area. Thus, compared with the case where the horizontal margin angle $\alpha_m$ is fixed, both the reduction of glare to the vehicles in front and the improvement of visibility can be achieved quite effectively.

Note that the basic range as described above is defined herein as a polygon containing all the vehicles-in-front, so that the basic range can be determined easily and with excellent repeatability.

(Flow for Determining an Illumination Mode Based on Vehicle Existent Area)

Figure 13:
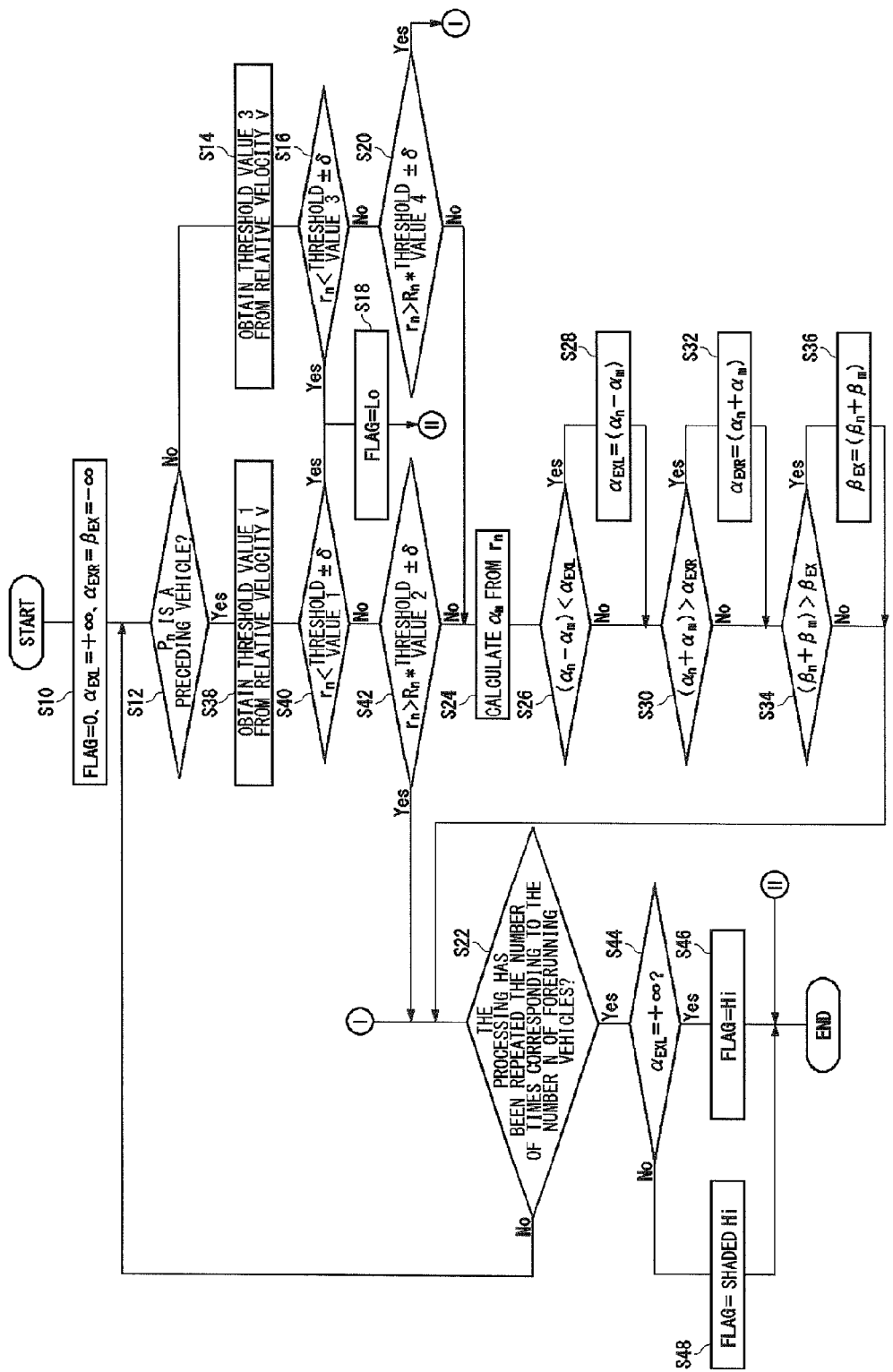
FIG. 13 is a flowchart showing a method for determining an illumination mode based on the existence range of a vehicle in front.

FIG. 13 is a flowchart showing a method for determining an illumination mode based on the vehicle existent area of a vehicle in front. This flow is repeated at predetermined timing when "auto-adjusted mode (shaded upper beam mode)" is selected by the lamp mode selector switch 16. Conceivable as the predetermined timing is, for example, the timing when the flow is repeated when a vehicle in front is detected in a measuring area by the forward vehicle detecting means 24. Hereinbelow, a description is given of a processing carried out by the headlamp controller 22.

Firstly, the headlamp controller 22 resets a flag, indicating a lamp (illumination) mode, to "0" and, at the same time, sets the right-side vehicle existent angle $\alpha_{E \times R}$ to $+\infty$ and sets the left-side vehicle existent angle $\alpha_{E \times L}$ and the vehicle existent range to $\beta_{E \times}$ to $-\infty$ (S10). Here, $\pm\infty$ may be a maximum value and a minimum value, respectively, which can be treated as variables by the headlamp controller 22.

Then, whether the vehicle-in-front n at position $P_n$ is a preceding vehicle or not is determined based on information acquired from the forward vehicle detecting means 24 (S12). Though discussed later, if a plurality of vehicles-in-front are detected, this processing is repeated the number of times equivalent to the number of detected vehicles-in-front. If the vehicle-in-front n is an oncoming vehicle traveling in the opposite direction (No of S12), a third threshold value (threshold value 3) will be evaluated from the relative velocity v using a function shown in FIG. 9C (S14). If the distance $r_n$ to the vehicle-in-front is less than the third threshold value $\pm\delta$ (Yes of S16), a value indicating a lower beam will be set in the illumination mode FLAG because the driver's vehicle is located too close to the vehicle-in-front n to be driven with the high beam on (S18) and this processing will be completed once.

If, on the other hand, the distance $r_n$ to the vehicle-in-front n is greater than or equal to the third threshold value $\pm\delta$ (No of S16), the distance $r_n$ to the vehicle-in-front n and ($R_n \times$ (fourth threshold value (threshold value 4)))$\pm\delta$ will be compared with each other (S20). $R_n$ is a correction coefficient calculated according to the facing angle $\omega$ between a driver's vehicle and a vehicle in front. If the distance $r_n$ is greater than or equal to ($R_n \times$(fourth threshold value))$\pm\delta$ (Yes of S20), the processing will move to Step S22. If the distance $r_n$ is less than ($R_n \times$(fourth threshold value))$\pm\delta$ (No of S20), a horizontal margin angle $\alpha_m$ is calculated from $r_n$ using a function shown in FIG. 12 (S24).

Then it is determined whether or not a value, which is obtained when the horizontal margin angle $\alpha_m$ is subtracted from the horizontal direction angle $\alpha_n$ that is one of parameters indicating the position $P_n$ of the vehicle-in-front n, is less than the left-side vehicle existent angle $\alpha_{E \times L}$ which has been set so far, namely, whether or not the vehicle-in-front n is present in a position leftmost from the light axis direction of the driver's vehicle (S26). If ($\alpha_n - \alpha_m$)<$\alpha_{E \times L}$ (Yes of S26), it will be determined that the vehicle-in-front n locates in the leftmost position, and $\alpha_{E\times L}=\alpha_n-\alpha_m$ is stored as a new left-side vehicle existent angle $\alpha_{E\times L}$ (S28).

If $(\alpha_n-\alpha_m)<\alpha_{E\times L}$ does not hold (No of S26), it will be determined whether or not the value of the horizontal direction angle $\alpha_n$ added with the horizontal margin angle $\alpha_m$ is greater than that of the right-side vehicle existent angle $\alpha_{E\times R}$, namely, whether or not the vehicle-in-front n is present in a position rightmost from the light axis direction of the driver's vehicle (S30). If $(\alpha_n+\alpha_m)>\alpha_{E\times R}$ (Yes of S30), it will be determined that the vehicle-in-front n locates in the rightmost position, and $\alpha_{E\times R}=\alpha_n+\alpha_m$ is stored as a new right-side vehicle existent angle $\alpha_{E\times R}$ (S32).

If $(\alpha_n+\alpha_m)>\alpha_{E\times R}$ does not hold (No of S30), it will be determined whether or not the value of the vertical direction angle $\beta_n$ (which is one of parameters indicating the position $P_n$ of the vehicle-in-front n) added with the vertical margin angle $\beta_m$ is greater than that of the vehicle existent range $\beta_{E\times}$ which has been set so far, namely, whether or not the vehicle-in-front n is present in a position uppermost from the light axis direction of the driver's vehicle (S34). If $(\beta_n+\beta_m)>\beta_{E\times}$ (Yes of S34), it will be determined that the vehicle-in-front n locates in the uppermost position, and $\beta_{E\times}=\beta_n+\beta_m$ is stored as the value of a new vehicle existent range $\beta_{E\times}$ (S36). If $(\beta_n+\beta_m)>\beta_{E\times}$ (No of S34), move to Step S22.

If the vehicle-in-front n is a preceding vehicle traveling ahead in the same direction as the driver's vehicle (Yes of S12), a first threshold value (threshold value 1) will be evaluated from the relative velocity v using a function shown in FIG. 9C (S38). If the distance $r_n$ to the vehicle-in-front n is less than the first threshold value $\pm\delta$ (Yes of S40), a value indicating a lower beam will be set in the illumination mode FLAG because the driver's vehicle is located too close to the vehicle-in-front n to be driven with the high beam on (S18) and this processing will be completed once.

If, on the other hand, the distance $r_n$ to the vehicle-in-front n is greater than or equal to the first threshold value $\pm\delta$ (No of S40), the distance $r_n$ to the vehicle-in-front n and ($R_n\times$(second threshold value (threshold value 2))$\pm\delta$ will be compared with each other (S42). If the distance $r_n$ is greater than or equal to ($R_n\times$(second threshold value))$\pm\delta$ (Yes of S42), the processing will move to Step S22. If the distance $r_n$ is less than ($R_n\times$(second threshold value))$\pm\delta$ (No of S42), a horizontal margin angle $\alpha_m$ is calculated from $r_n$ using a function shown in FIG. 12 (S24). The processings of the Steps S26 to S36 are similar to those performed in the case where the vehicle-in-front n is an oncoming vehicle.

It is determined whether the above-described processing has been repeated the number of times corresponding to the number N of detected vehicles-in-front or not (S22). If the processing is not repeated (No of S22), the processings of Steps S12 to S42 will be executed as appropriate. If, on the other hand, the processings of Steps S12 to S42 has been repeated the number of times corresponding to the number N of detected vehicles-in-front (Yes of S22), it is determined whether or not the left-side vehicle existent angle $\alpha_{E\times L}$ is identical to $-\infty$ which is the initial set value (S44).

If $\alpha_{E\times L}=-\infty$ (Yes of S44), this indicates that no vehicles-in-front has contributed to the decision of the vehicle existent area has been found. Such a case includes a case where the detected vehicle-in-front is a preceding vehicle far from the second threshold value or an oncoming vehicle far from the fourth threshold value. In this case, it is less likely for the vehicle-in-front to experience glare even if the driver's vehicle continues to travel with a normal upper beam on. Thus a value indicating the normal upper beam is set to the illumination mode FLAG (S46) and this processing is completed once. If $\alpha_{E\times L}=-\infty$ does not hold (No of S44), this indicates that there is a vehicle-in-front to be light-shielded by the shaded upper beam and therefore the glare is likely to be experienced by the vehicle-in-front if the driver's vehicle continues to travel with a normal upper beam on. Thus a value indicating the shaded upper beam is set to the illumination mode FLAG (S48) and this processing is completed once. In case any contradiction occurs during the execution of processings shown in the flowchart of FIG. 13, a fail-safe operation by which the ongoing operation is forcibly switched to a lower beam may be included in the processings.

As described above, the vehicle existent range in the horizontal direction of the position $P_n$ of the vehicle-in-front n is a range demarcated by $(\alpha_n-\alpha_m)$ to $(\alpha_n+\alpha_m)$ with respect to the light axis direction of the driver's vehicle. If there is a plurality of vehicles-in-front, a vehicle existent range $\alpha_{E\times}=\beta_{E\times R}-\alpha_{E\times L}$ will be finally obtained where the minimum value of the total vehicle existent ranges obtained by superposing the vehicle existent range of each vehicle-in-front is set to the left-side vehicle existent angle $\alpha_{E\times L}$ and the maximum value thereof is set to the right-side vehicle existent angle $\alpha_{E\times R}$.

Similarly, the vehicle existent range $\beta_{E\times}$ in the vertical direction of the vehicle-in-front is also obtained in the above-described processing. However, this vehicle existent range is determined by excluding the presence of vehicles-in-front positioned below the H-H line (horizontal line). For a vehicle-in-front positioned below the horizontal line, this vehicle-in-front is illuminated by the lower beam distribution pattern regardless of whether the upper beam distribution pattern is formed or not. Thus it is possible to travel with the upper beam distribution pattern on, by determining the vehicle existent area by excluding the vehicle-in-front positioned below the horizontal line even though the vehicle-in-front is covered by an illumination range of upper beam distribution pattern.

In the light of the foregoing circumstances, the headlamp controller 22 according to the present embodiment determines the vehicle existent area by excluding the vehicle-in-front which does not lie above the horizontal line as viewed from the driver's vehicle. And if the entirety of vehicle existent area is contained in the shaded region, for example, then the headlamp controller 22 will control the headlamp unit 20 such that a shaded region is non-illuminated. And if at least a part of the vehicle existent area is contained in an upper beam distribution pattern area other than the shaded region, the headlamp controller 22 will control the headlamp unit 20 such that no upper beam distribution pattern itself is formed, namely, such that lower beam is irradiated.

In terms of a method of control, a method for controlling an automotive headlamp apparatus according to the present embodiment includes the following steps (1)-(3). That is, the method includes: (1) the step for determining the vehicle existent area of vehicles-in-front travelling ahead of the drive's vehicle; (2) the step for comparing a shaded region, capable of creating a non-illumination state in an upper beam distribution pattern, with the vehicle existent area; and (3) the step for controlling the headlamp unit so that no upper beam distribution pattern is formed when there is an overlapped portion between a region, other than the shaded region, in the upper beam distribution pattern and the vehicle existent area. In the step for determining the vehicle existent area, the vehicle existent area is determined by excluding the vehicle-in-front that does not lie in a predetermined range in the vertical direction as viewed from the driver's vehicle.

With this control method implemented, the vehicle existent area is determined in such a manner that any vehicles-in-front which are not located in a predetermined range in the vertical direction as viewed from the driver's vehicle are excluded.

Thus, if a vehicle-in-front is present in a position in the vertical direction where the effect of glare is small, the illumination by the upper beam distribution pattern can be maintained. As a result, the circumstances for a drive with an upper beam distribution pattern on can increase.

(Swivelable Lamp Unit)

Figure 14A:
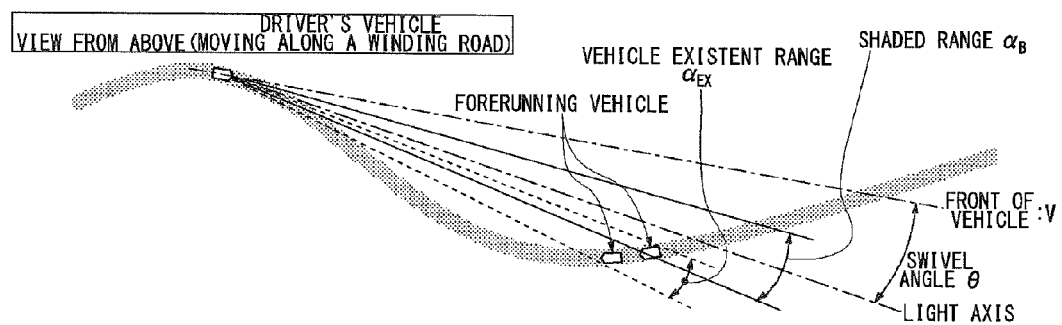
FIG. 14A is a diagram, viewed from above, showing a relationship between a vehicle existent range and a shaded range in a situation where a light axis swivels while a vehicle is moving along a winding road (without correction of swivel angle)
Figure 14B:
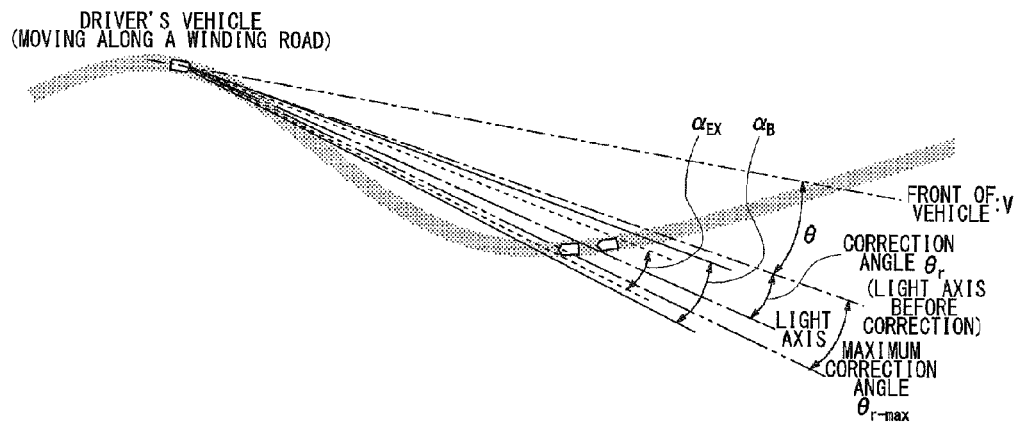
FIG. 14B is a diagram, viewed from above, showing a relationship between a vehicle existent range and a shaded range in a situation where a light axis swivels while a vehicle is moving along a winding road (with swivel angle corrected)

A description is given hereunder of a control of shaded upper beam in a structure where an upper beam lamp unit is swivelable. Since the lamp unit is so configured as to be swivelable, the chances of travelling using a shaded upper beam even if the center position of a shaded region cannot be moved can be increased. FIG. 14A is a diagram, viewed from above, showing a relationship between a vehicle existent range and a shaded range in a situation where the light axis swivels while a vehicle is moving along a winding road (without correction of swivel angle). FIG. 14B is a diagram, viewed from above, showing a relationship between a vehicle existent range and a shaded range in a situation where the light axis swivels while a vehicle is moving along a winding road (with the swivel angle corrected).

In FIG. 14A, the driver's vehicle is moving along a winding road. When the light axis swivels by an angle $\theta$ while it is moving along the winding road, the entirety of vehicle existent range $\alpha_{Ex}$ where the vehicle-in-front exists cannot be light-intercepted and therefore the driver's vehicle cannot travel with the shaded upper beam on and must travel using a lower beam. FIG. 14A illustrates such a condition as this. In contrast to this, in FIG. 14B the automotive headlamp apparatus swivels at an angle which is the sum of the normal swivel angle $\theta$ and a correction angle $\theta_r$ and therefore the entirety of vehicle existent range $\alpha_{Ex}$ is contained within a shaded range $\alpha_B$. As a result, the driver's vehicle can travel with the shaded upper beam on. Using such a swivel function capable of correcting the swivel angle can increase the chances of travelling using a shaded upper beam not only when the driver's vehicle is moving along a winding road but also when it is travelling in a straight line.

The swivel angle $\theta$ is used primarily to secure the field of front vision along a winding road and is therefore optimized for this purpose. It is not necessarily desirable that the swivel angle $\theta$ thus set is freely corrected in order to prioritize the travelling with the shaded upper beam. Generally, the maximum swivelable angle is about ±20 degrees depending on the structure of a lamp unit used. For instance, consider a case where the driver's vehicle is driving along a right-hand curve with a normal upper beam and the light axis is swiveled at 20 degrees to the right. In this case, if a vehicle appears from a distance on the left side and, in response to this, the mode is switched to the shaded upper beam so as to swivel again the swivel angle to the left, the far visible distance will be reduced. In particular, if travelling along a sharper curve having a larger curvature that leads to a larger swivel angle, the driver will drive the vehicle directing his/her attention to a location closer to his/her vehicle. Thus the control performed as described above is not preferred in this case.

Figure 15:
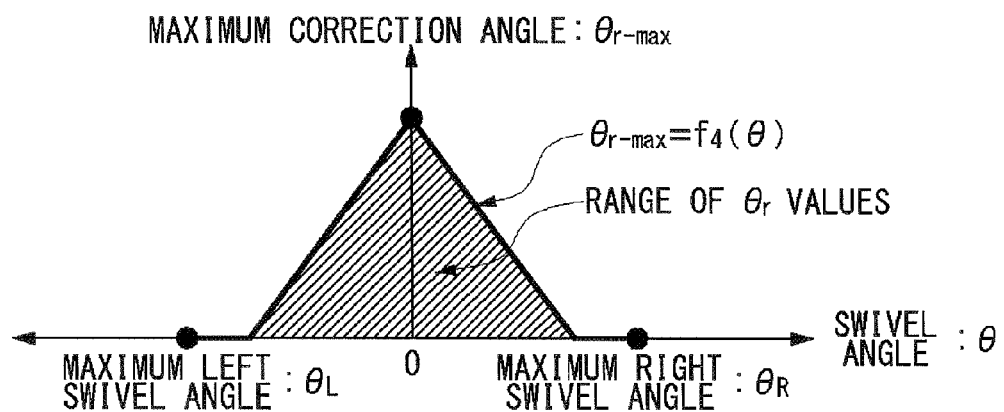
FIG. 15 is a diagram showing a relationship between a swivel angle and a maximum correction angle.

In view of the foregoing circumstances, a description is now given of a method for increasing the chances of travelling using a shaded upper beam. FIG. 15 is a diagram showing a relationship between the swivel angle and the maximum correction angle. As shown in FIG. 15, the upper limit of correction angle $\theta_r$ to achieve a shaded upper beam is defined as a maximum correction angle $\theta_{r\text{-}max}$ and also a function is set so that the larger the swivel angle, the smaller the maximum correction angle $\theta_{r\text{-}max}$ becomes. The correction angle $\theta_r$ is set to its optimum value within the range of the maximum correction angle $\theta_{r\text{-}max}$. In other words, the correction angle $\theta_r$ is set to the minimum correction angle that allows the driver's vehicle to travel with the shaded upper beam.

(Basic Control Method in a Shaded Upper Beam Mode)

Figure 16:
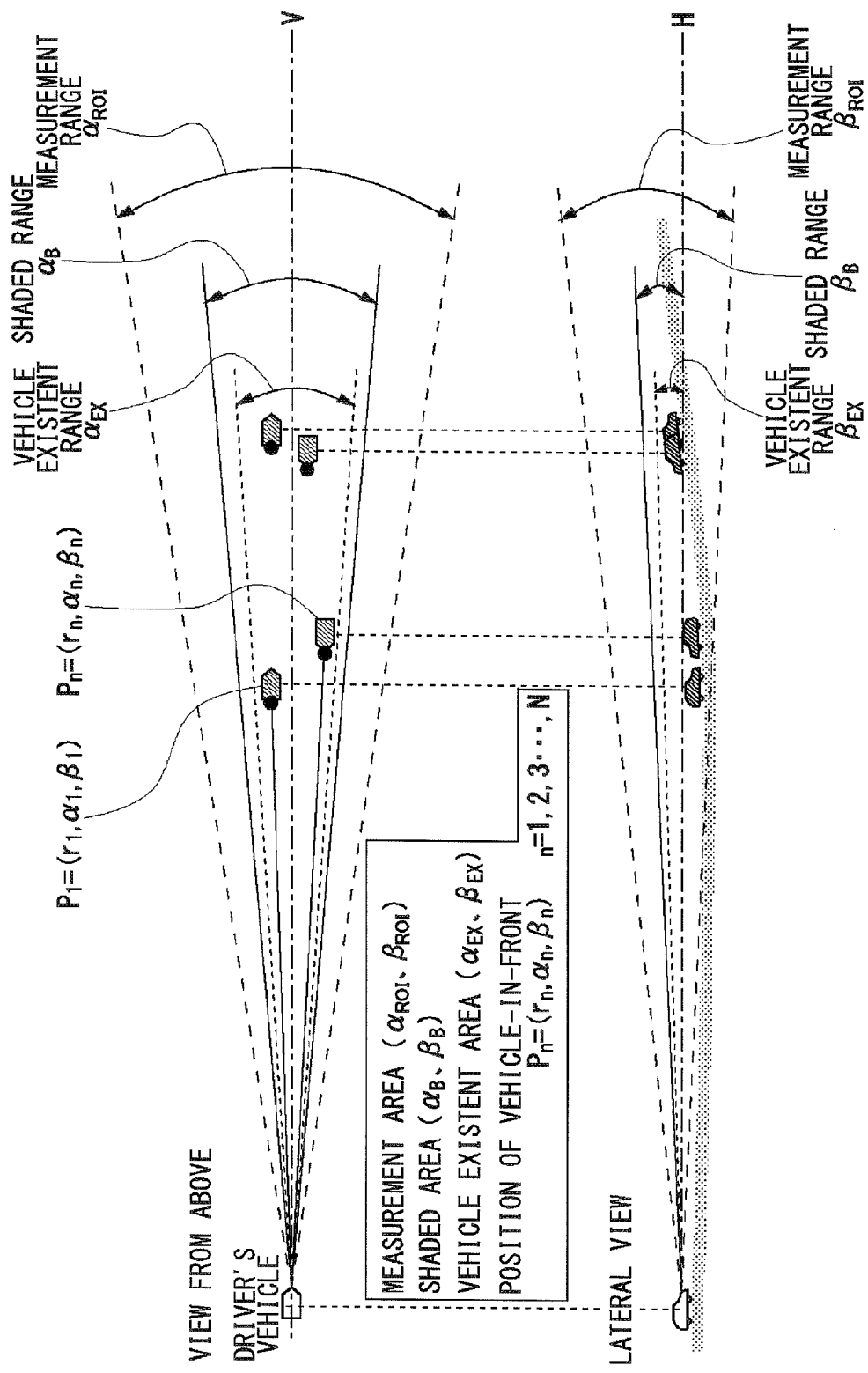
FIG. 16 is a schematic illustration showing a positional relationship between a driver's vehicle and vehicles-in-front viewed from above and viewed from a side, and a relationship between each vehicle existent area.

FIG. 16 is a schematic illustration showing a positional relationship between a driver's vehicle and vehicles-in-front viewed from above and viewed from a side, and a relationship between each vehicle existent area. The basic novel idea in a control technique underlying the present embodiment is that the time length during which the vehicle existent area of a vehicle-in-front within a measuring area can be contained in the shaded region depends on how to perform control in such a manner as to maintain the shaded upper beam state.

That is, in terms of a method of control, a control method for controlling an automotive headlamp apparatus performs control as follows. The vehicle existent area where vehicles-in-front travelling ahead of the driver's vehicle is located is compared with a shaded region (non-illuminated region). If the entirety of vehicle existent area is contained in the shaded region, the headlamp unit is so controlled as to form an upper beam distribution pattern where the shaded region is formed. At the same time, if at least a part of the vehicle existent area is contained in the upper beam distribution pattern area other than the shade area, the headlamp unit is so controlled as not to form the upper beam distribution pattern.

If the automotive headlamp apparatus 12 is of a structure such that the light axis is swivelable and the shaded region can be varied, the headlamp controller 22 can control variably a swivel amount (swivel angle $\theta$+correction angle $\theta_r$) and the shaded region in such a manner that the entirety of vehicle existent area is contained within the minimum shaded region. As a result, both the reduction of glare to the vehicles in front and the improvement of visibility can be achieved quite effectively.

Figure 17:
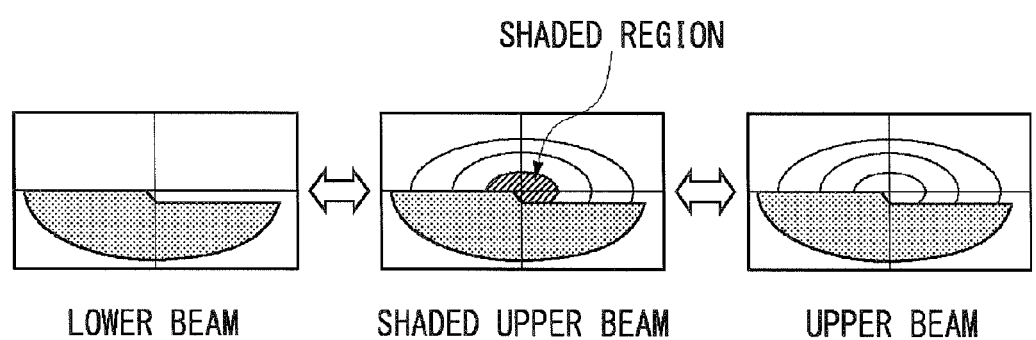
FIG. 17 is a schematic illustration showing light distribution patterns of lower beam (Lo beam), shaded upper beam (shaded Hi beam) and normal upper beam (Hi beam) in an automotive headlamp apparatus according to an embodiment of the present invention.
Figure 18:
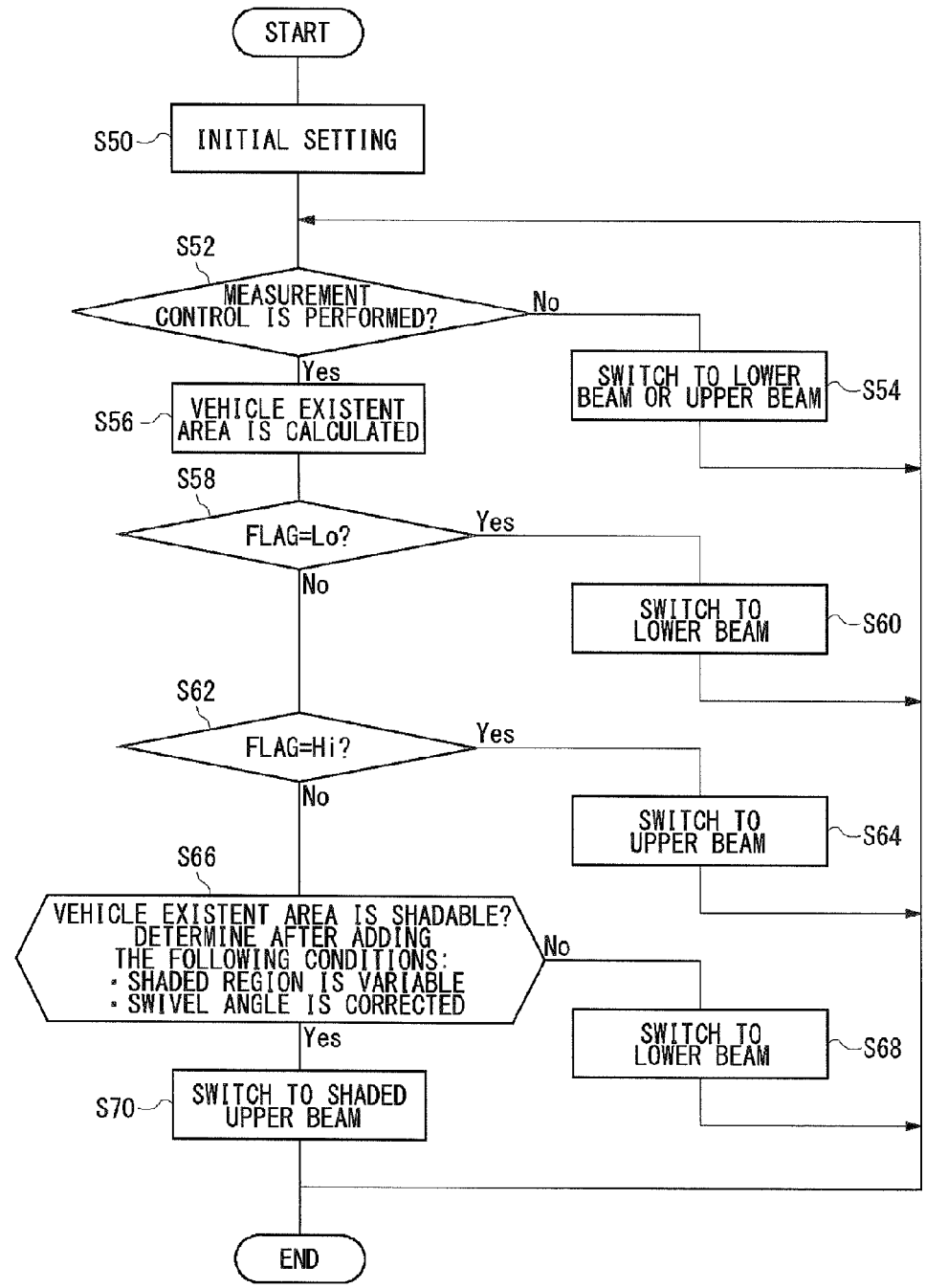
FIG. 18 is a flowchart showing a method for controlling a headlamp unit in a shaded upper beam mode according to an embodiment of the present invention.

FIG. 17 is a schematic illustration showing light distribution patterns of lower beam (Lo beam), shaded upper beam (shaded Hi beam) and normal upper beam (Hi beam) in the automotive headlamp apparatus 12 according to the present embodiment. FIG. 18 is a flowchart showing a method for controlling the headlamp unit in the shaded upper beam mode according to the present embodiment.

As the shaded upper beam mode is selected by the lamp mode selector switch 16, the initial setting required for the measurement and the like of vehicles-in-front is made (S50) and whether a measurement control is performed or not is determined (S52). If a "control OFF switch" provided in a vehicle is turned on or the switching operation is determined by the driver himself/herself, the switching will be set to the lower beam mode or normal upper beam mode giving priority to the signal status or switching status of switches and the like.

If the measurement control is not performed (No of S52), the illumination will be switched to the lower beam or normal upper beam by a preset processing (S54). If the measurement control is performed (Yes of S52), the vehicle existent area will be calculated by the use of a method as shown in FIG. 13 and the illumination mode FLAG corresponding to the calculated vehicle existent area will be set (S56). In the measurement, the vehicle existent area is obtained from the position of a vehicle ahead of the driver's vehicle and the distance thereto. This vehicle existent area is obtained therefrom based on information acquired from a camera or radar unit mounted on the driver's vehicle, positional information, acquired from a GPS device mounted on each vehicle, contained in communications between each vehicle or communications between various apparatuses placed in roads, another positional information contained in infrastructure information acquired from vehicle detection devices placed in the roads, and so forth. In case the measurement is not carried out normally, a fail-safe operation by which the ongoing operation is switched to the lower beam mode may be included in the above-described processings.

If a value indicating a lower beam is set in the illumination mode FLAG (Yes of S58), the illumination will be switched to the lower beam mode (S60). If a value indicating a lower beam is not set in the illumination mode FLAG (No of S58), it will be determined whether a value indicating a normal upper beam is set in the illumination mode FLAG or not (S62). If a value indicating a normal upper beam is set in the illumination mode FLAG (Yes of S62), the illumination will be switched to the normal upper beam mode (S64). If a value indicating a normal upper beam is not set in the illumination mode FLAG (No of S62), a value indicating the shaded upper beam mode will be set in the illumination mode FLAG.

Then the headlamp controller 22 determines whether or not a shaded region can be formed so that drivers of vehicles-in-front contained in the calculated vehicle existent area do not experience the glare from the driver's vehicle (S66). At this time, if it is possible to vary the shaded range or correct the swivel angle because of a structure or function of the headlamp unit, whether the vehicle existent area can be light-shielded or not will be determined after such conditions have been added. If the vehicle existent area cannot be light-shield even by varying the shaded region or swiveling the light axis (No of S66), the illumination will be switched to the lower beam mode in order not to cause glare in the vehicles-in-front (S68). If the vehicle existent area can be light-shielded (Yes of S66), the illumination will be switched to the shaded upper beam mode (S70) and therefore the visibility is enhanced without causing the glare in the vehicles-in-front.

If the automotive headlamp apparatus is comprised of a headlamp unit capable of varying the shape of a shaded region, it is preferable that the headlamp unit controls the shape of a shaded region in such a manner that the vehicle existent area can be contained within the minimum shaded region. As a result, both the enhancement of distant visibility and the reduction of glare as experienced by the drivers of the vehicles-in-front are achieved quite effectively. If the automotive headlamp apparatus is comprised of a swiveable headlamp unit, it is preferable that the headlamp unit controls the swivel angle in such a manner that the shaded region can contain the vehicle existent area with the minimum displacement of the light axis. As a result, the swivel capability is used to such an extent that the field of front vision does not deteriorate and therefore an increased length of time during which the driver can travel in the shaded upper beam mode can be achieved. At the same time, if the automotive headlamp apparatus is comprised of a swiveable headlamp unit, it is preferable that the headlamp unit variably controls the shape of a shaded region in such a manner that the vehicle existent area can be contained in the minimum shaded region within a range of the maximum correction angle of the swivel angle.

A description has been given so far of the definition of each value necessary for the control and the basic control method. A detailed description will be given hereinbelow of exemplary embodiments of shaded beam mode. FIG. 19 is a table showing examples of combination of the light distribution patterns in a shaded upper beam and the formation of shaded regions.

[First Exemplary Embodiment]

Figure 20A:
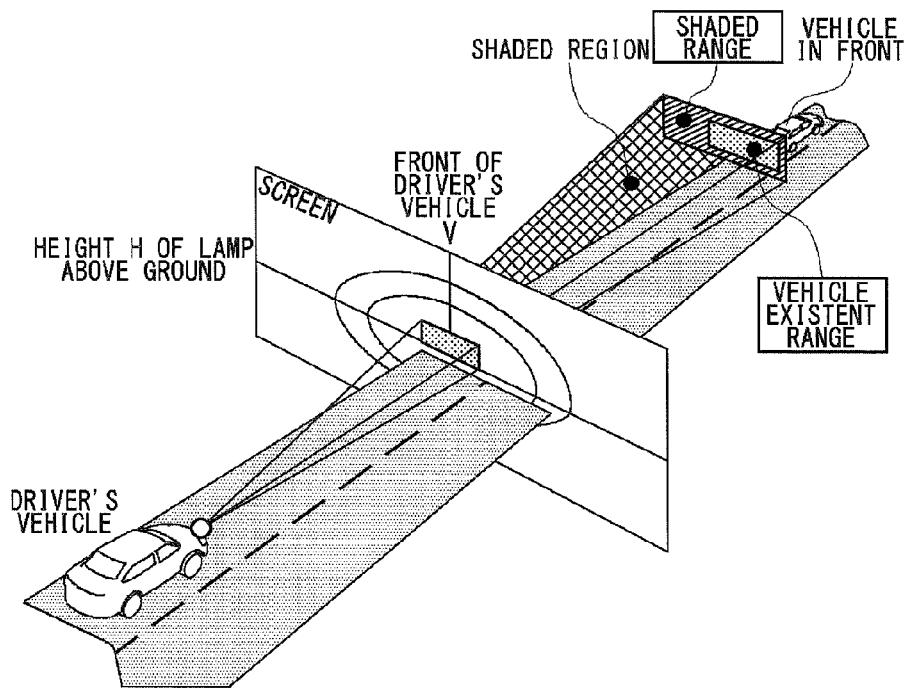
FIG. 20A is a schematic illustration showing that a driver's vehicle provided with an automotive headlamp apparatus according to a first exemplary embodiment illuminates a vehicle in front while traveling along a straight track.
Figure 20B:
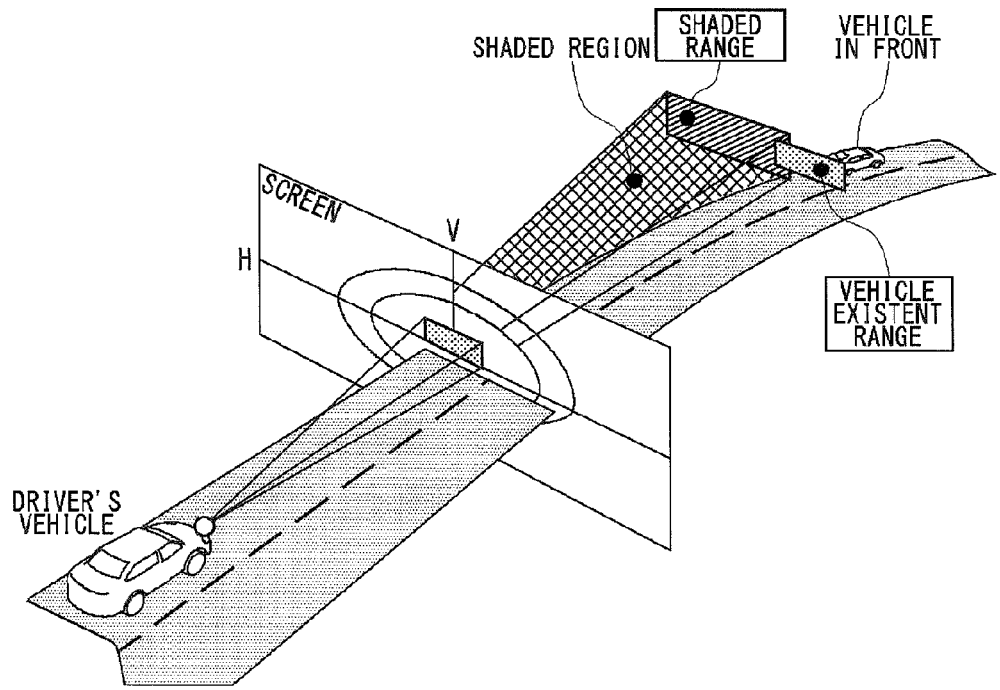
FIG. 20B is a schematic illustration showing that a driver's vehicle provided with an automotive headlamp apparatus according to a first exemplary embodiment illuminates a vehicle in front while it travels along a winding road.

A headlamp unit according to a first exemplary embodiment is so configured that a shaded region whose shape is rectangular or circular is formed in a region inside an upper beam light distribution pattern, and the headlamp unit is provided with a swivel capability. FIG. 20A is a schematic illustration showing that a driver's vehicle provided with an automotive headlamp apparatus according to the first exemplary embodiment illuminates a vehicle in front while traveling along a straight track. FIG. 20B is a schematic illustration showing that a driver's vehicle provided with an automotive headlamp apparatus according to the first exemplary embodiment illuminates a vehicle in front while traveling along a winding road. FIG. 21A is a diagram showing that a shaded range as viewed from a driver's vehicle in a situation of FIG. 20A is replaced by an on-screen projection. FIG. 21B is a diagram showing that a vehicle existent range as viewed from a driver's vehicle in a situation of FIG. 20B is replaced by an on-screen projection.

As long as the vehicle existent range of a vehicle-in-front can be contained within a shaded range in the straight track as shown in FIG. 20A, the vehicle equipped with the automotive headlamp apparatus according to the first exemplary embodiment travels with the shaded upper beam mode on, to a maximum extent. Suppose that the vehicle existent range cannot be readily contained within the shaded range in the winding road and the like as shown in FIG. 20B. Even in such a case, if the vehicle existent range can be contained therewithin by swiveling the light axis, a swivel control is performed and thereby the vehicle equipped with the automotive headlamp apparatus according to the first exemplary embodiment travels with the shaded upper beam on, to a maximum extent.

Here, the shaded range is expressed by the shaded range $\alpha_B$ and the shaded range $\beta_B$ so as to form a shaded region ($\alpha_B$, $\beta_B$). Likewise, the vehicle existent range is expressed by the vehicle existent range $\alpha_{Ex}$ and a shaded range $\beta_{Ex}$ so as to form a vehicle existent area ($\alpha_{Ex}$, $\beta_{Ex}$). Now, the shaded range $\alpha_B$ and the vehicle existent range $\alpha_{Ex}$ are expressed as follows.

$$\alpha_B = \alpha_{BR} - \alpha_{BL}$$

$$\alpha_{Ex} = \alpha_{ExR} - \alpha_{ExL}$$

Then whether the pattern is shadable or not is determined in such a manner that the values of right-side vehicle existent angle $\alpha_{ExR}$, the left-side vehicle existent angle $\alpha_{ExL}$ and the vehicle existent range $\beta_{Ex}$ obtained in the processing shown in FIG. 13 are compared with the shaded range in magnitude. Note that the illumination mode is selected in consideration of not only the comparison between the aforementioned shaded range and the vehicle existent range but also the distance to a vehicle-in-front determined by each threshold value indicated in the flowchart of FIG. 13.

In the automotive headlamp apparatus having a swivel capability, the correction angle $\theta_r$ is set within a range that does not exceed the maximum correction angle $\theta_{r\text{-}max}$ determined by a function $f_4$ of the swivel angle $\theta$ as shown in FIG. 15. Whether the vehicle existent range can be contained within the shaded range or not is determined by varying the swivel angle $\theta$ of the light axis by the correction angle $\theta_r$. If the vehicle existent range cannot be contained within the shaded range, the headlamp controller 22 will switch the illumination to the lower beam mode. If the vehicle existent range can be contained therewithin, the headlamp controller 22 will switch the illumination to the shaded upper beam mode by swiveling the light axis by the correction angle $\theta_r$. In so doing, the headlamp controller 22 controls the movement of the light axis in such a manner that the absolute value of the correction angle $\theta_r$ becomes a minimum value, namely, the swivel amount due to the correction becomes a minimum angle. If the vehicle existent range can be contained within the shaded range without going through the trouble of correcting the swivel angle, the swivel for correction will not be carried out.

When the light axis is corrected by the correction angle $\theta_r$, a measuring area is set in accordance with the light axis after correction. Note, however, the correction angle $\theta_r$ is an angle relative to the swivel angle $\theta$ obtained from the curvature or the like of the road on which the driver's vehicle is currently running. Hence, the following control will not be performed. That is, with the light axis after correction being a swivel angle $\theta$, a correction angle is further obtained. Such a control as this will not be performed in the present embodiment. As a result, prevented are the situations wherein a correction angle is added to the angle, after correction, in the light axis direction and therefore the light axis is shifted an indefinite number of times.

[Second Exemplary Embodiment]

Figure 23:
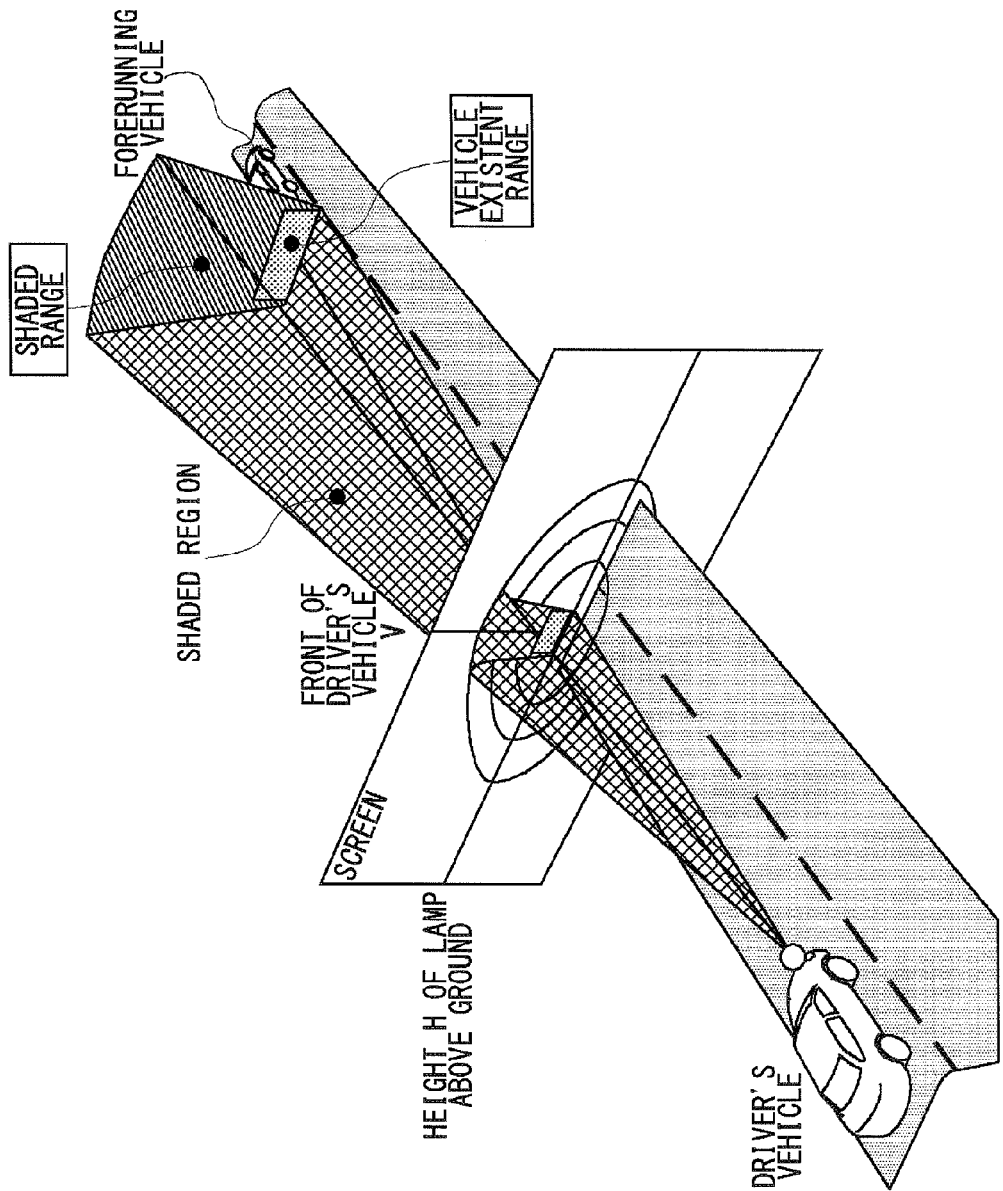
FIG. 23 is a schematic illustration showing that a driver's vehicle provided with an automotive headlamp apparatus according to a second exemplary embodiment illuminates a vehicle in front while traveling along a straight track.
Figure 24B:
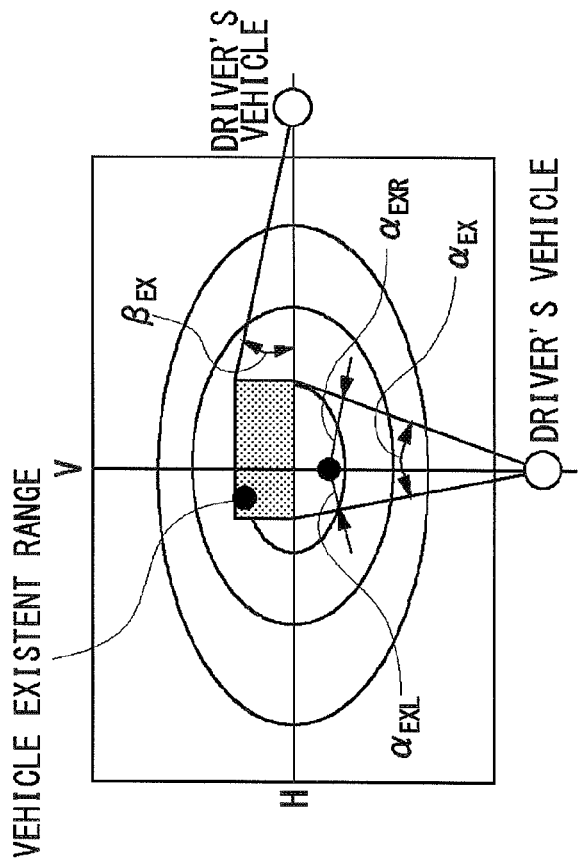
FIG. 24B is a diagram showing that a vehicle existent range as viewed from a driver's vehicle in a situation of FIG. 23 is replaced by an on-screen projection.
Figure 24A:
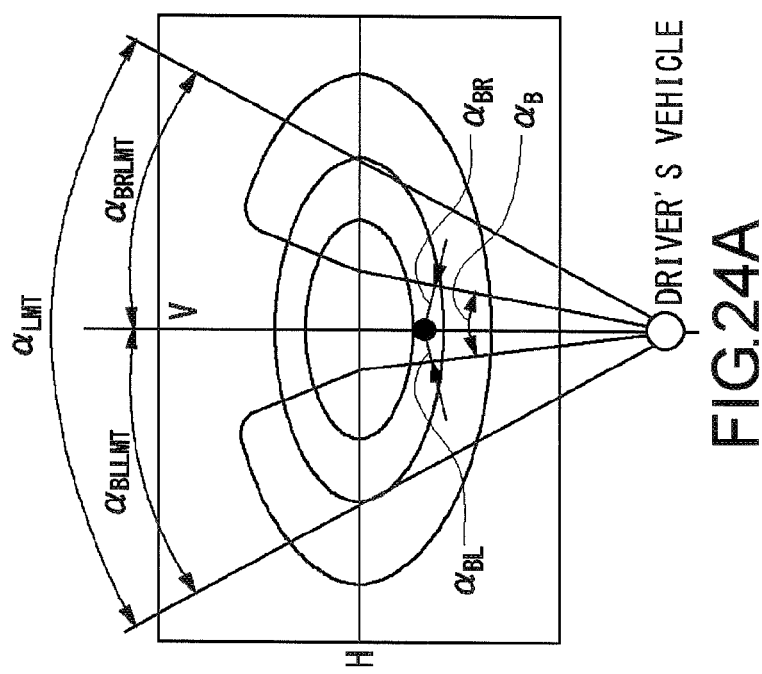
FIG. 24A is a diagram showing that a shadable range as viewed from a driver's vehicle in a situation of FIG. 23 is replaced by an on-screen projection.

A headlamp unit according to a second exemplary embodiment is so configured that a shaded region (recessed portion) is formed in a center of a region above the H-H line of the upper beam distribution pattern and that the shape of the shaded region is variable. FIG. 23 is a schematic illustration showing that a driver's vehicle provided with an automotive headlamp apparatus according to the second exemplary embodiment illuminates a vehicle in front while travelling along a straight track. FIG. 24A is a diagram showing that a shadable range as viewed from a driver's vehicle in a situation of FIG. 23 is replaced by an on-screen projection. FIG. 24B is a diagram showing that a vehicle existent range as viewed from a driver's vehicle in a situation of FIG. 23 is replaced by an on-screen projection.

As long as the vehicle existent range of a vehicle-in-front can be contained within a shadable range in the straight track as shown in FIG. 23, the vehicle equipped with the automotive headlamp apparatus according to the second exemplary embodiment travels with the shaded upper beam mode on, to a maximum extent, by having the shaded range follow the change in the vehicle existent range.

Here, the vehicle existent range is expressed by the vehicle existent range $\alpha_{Ex}$ and the vehicle existent range $\beta_{Ex}$ so as to form a vehicle existent area ($\alpha_{Ex}$, $\beta_{Ex}$). However, since the shaded range is so provided that the upper beam distribution pattern above the H-H line is divided into right and left parts, the shaded range $\beta_B$ indicating the vertical direction is not set and a shaded region ($\alpha_B$, –) is formed by the shaded range $\alpha_B$. Now, the shaded range $\alpha_B$ and the vehicle existent range $\alpha_{Ex}$ are expressed as follows.

$$\alpha_B = \alpha_{ER} - \alpha_{BL}$$

$$\alpha_{Ex} = \alpha_{ExR} - \alpha_{ExL}$$

In the second exemplary embodiment, the shaded range can be varied. The shaded range that can vary is expressed by $\alpha_{LMT} = \alpha_{BRLMT} - \alpha_{BLLMT}$ During a time period when the vehicle existent range of a vehicle-in-front obtained by the processing as shown in FIG. 13 is contained in the variable shaded range ($\alpha_{BLLMT} \leq \alpha_{BL}$ and $\alpha_{BR} \leq \alpha_{BRLMT}$), the shaded range is variably controlled in such a manner that the shaded range agrees with the vehicle existent range. As a result, the driver's vehicle continues to travel with the shaded upper beam mode on. Note that the illumination mode is selected in consideration of not only the comparison between the aforementioned variable shaded range and the vehicle existent range but also the distance to a vehicle-in-front determined by each threshold value indicated in the flowchart of FIG. 13. FIG. 25 is a table showing detailed control conditions in the second exemplary embodiment.

The automotive headlamp apparatus exemplified by way of the above-described embodiment and exemplary embodiments may also be characterized as follows.

Even in the case where there are a plurality of vehicles running ahead of the driver's vehicle, the automotive headlamp apparatus according to the present embodiment includes a means for setting a single vehicle existent area that contains the plurality of vehicles-in-front, and a means for making a partial region non-illuminated if the single vehicle existent area set is contained in the partial region. By implementing such a structure as this, if the entirety of the single vehicle existent area that contains a plurality of vehicles-in-front is contained in the partial region, which can be non-illuminated, of the upper beam distribution pattern, then said partial region will be non-illuminated and therefore the glare to the drivers of vehicles-in-front can be reduced. Also, since a single vehicle existent area can be set even if a plurality of vehicles are running in front, only one-time comparison is required between this single vehicle existent area and the partial region of the upper beam distribution pattern that can be non-illuminated. Thus, the processing load of the headlamp controller 22 can be lightened.

It is to be noted that a relationship between the shaded "range" and the shaded "region" and that between the vehicle existent "region" and the vehicle existent "range" may be thought of as a relationship between a three-dimensional (3D) "region" and a "range" corresponding to a screen onto which the 3D region is projected. Then they may be treated as parameters related to each other such that one is convertible into the other and vice versa.

The present invention has been described by referring to each of the above-described embodiments. However, the present invention is not limited to the above-described embodiments only, and those resulting from any combination of them as appropriate or substitution are also within the scope of the present invention. Also, it is understood by those skilled in the art that various modifications such as changes in the order of combination or processings made as appropriate in each embodiment or changes in design may be added to the embodiments based on their knowledge and the embodiments added with such modifications are also within the scope of the present invention.

What is claimed is:

1. An automotive headlamp apparatus comprising:
   a headlamp unit placed in a vehicle; and
   a control unit which controls the illumination of the headlamp unit according to a vehicle existent area where a vehicle-in-front travelling in front of a driver's vehicle exists,
   wherein the headlamp unit (i) forms a lower beam distribution pattern for illuminating a region immediately in front of the driver's vehicle, (ii) forms an upper beam distribution pattern having a shape different from that of the lower beam distribution pattern and for illuminating a region above the region illuminated by the lower beam distribution pattern, and (iii) is configured so that a partial region of the upper beam distribution pattern is capable of being non-illuminated, and
   wherein the control unit determines the vehicle existent area, based on information related to the vehicle-in-front positioned at an end in a horizontal direction, of a plurality of vehicles-in-front travelling in front of the driver's vehicle;

when the entirety of vehicle existent area is contained within the partial region of the upper beam distribution pattern, the control unit controls the headlamp unit in such a manner that the partial region is non-illuminated; and when at least a part of the vehicle existent area is contained within a region of the upper beam distribution pattern which is other than the partial region, the control unit controls the headlamp unit in such a manner that the upper beam distribution pattern is not formed.

2. An automotive headlamp apparatus comprising:

a headlamp unit placed in a vehicle; and a control unit which controls the illumination of the headlamp unit according to a vehicle existent area where a vehicle-in-front travelling in front of a driver's vehicle exists, wherein the headlamp unit (i) forms a lower beam distribution pattern for illuminating a region immediately in front of the driver's vehicle, (ii) forms an upper beam distribution pattern having a shape different from that of the lower beam distribution pattern and capable of illuminating a region above the region illuminated by the lower beam distribution pattern, and (ii) is configured so that a partial region of the upper beam distribution pattern is capable of being non-illuminated, and wherein the control unit determines the vehicle existent area, based on information related to the vehicle-in-front positioned at an end in a vertical direction, of a plurality of vehicles-in-front travelling in front of the driver's vehicle;

when the entirety of vehicle existent area is contained within the partial region, the control unit controls the headlamp unit in such a manner that the partial region is non-illuminated; and when at least a part of the vehicle existent area is contained within a region of the upper beam distribution pattern which is other than the partial region, the control unit controls the headlamp unit in such a manner that the upper beam distribution pattern is not formed.

3. The automotive headlamp apparatus according to claim 1, wherein the control unit controls the point of switching the light distribution such that the point is different between the case where a state of the entirety of vehicle existent area contained in partial region changes to a state thereof not contained and the opposite case where a state of the entirety of vehicle existent area not contained in the partial region changes to a state thereof contained.

4. The automotive headlamp apparatus according to claim 1, wherein the headlamp unit is configured to vary the partial region, and the control unit controls the headlamp unit so that the partial region is non-illuminated if the entirety of vehicle existence area is included in a range of variation of the partial region.

5. The automotive headlamp apparatus according to claim 1, wherein the headlamp unit is configured to form a doughnut-shaped light distribution pattern in which a middle portion of the upper beam distribution pattern including an intersection between a horizontal line and a vertical line is non-illuminated.

6. The automotive headlamp apparatus according to claim 1, wherein the headlamp unit is configured to form a concave light distribution pattern in which a middle portion of an upper beam region above a horizontal line of the upper beam distribution pattern is non-illuminated.

7. The automotive headlamp apparatus according to claim 1, wherein the headlamp unit is configured to form a one-sided light distribution pattern in which one side of an upper beam region above a horizontal line of the upper beam distribution pattern in a horizontal direction is non-illuminated.

8. An automotive headlamp apparatus comprising:

a headlamp unit placed in a vehicle; and a control unit which controls the illumination of the headlamp unit according to a vehicle existent area where a vehicle-in-front travelling in front of a driver's vehicle exists, wherein the headlamp unit (i) forms a lower beam distribution pattern for illuminating a region immediately in front of the driver's vehicle, (ii) forms an upper beam distribution pattern having a shape different from that of the lower beam distribution pattern and capable of illuminating a region above a region illuminated by the lower beam distribution pattern, and (iii) is configured so that a partial region of the upper beam distribution pattern is capable of being non-illuminated, and wherein the control unit controls the headlamp unit in such a manner that the partial region is non-illuminated in accordance with information related to a facing angle of the vehicle-in-front travelling in front of the driver's vehicle.

9. The automotive headlamp apparatus according to claim 8, wherein the headlamp unit is configured to form a doughnut-shaped light distribution pattern in which a middle portion of the upper beam distribution pattern including an intersection between a horizontal line and a vertical line is non-illuminated.

10. The automotive headlamp apparatus according to claim 8, wherein the headlamp unit is configured to form a concave light distribution pattern in which a middle portion of an upper beam region above a horizontal line of the upper beam distribution pattern is non-illuminated.

11. The automotive headlamp apparatus according to claim 8, wherein the headlamp unit is configured to form a one-sided light distribution pattern in which one side of an upper beam region above a horizontal line of the upper beam distribution pattern in a horizontal direction is non-illuminated.

12. An automotive headlamp apparatus comprising:

a headlamp unit placed in a vehicle; and a control unit which controls the illumination of the headlamp unit according to a vehicle existent area where a vehicle-in-front travelling in front of a driver's vehicle exists, wherein the headlamp unit (i) forms a lower beam distribution pattern for illuminating a region immediately in front of the driver's vehicle, (ii) forms an upper beam distribution pattern having a shape different from that of the lower beam distribution pattern and capable of illuminating a region above a region illuminated by the lower beam distribution pattern, and (iii) is configured so that a partial region of the upper beam distribution pattern is capable of being non-illuminated, and wherein the control unit determines the vehicle existent area, based on a correction range determined by information correlated to a distance to the vehicle-in-front in addition to a basic range where the vehicle-in-front exists as seen from the driver's vehicle;

when the entirety of vehicle existent area is contained within the partial region, the control unit controls the headlamp unit in such a manner that the partial region is non-illuminated; and when at least a part of the vehicle existent area is contained within a region of the upper beam distribution pattern which is other than the partial region, the control unit controls the headlamp unit in such a manner that the upper beam distribution pattern is not formed.

13. The automotive headlamp apparatus according to claim 12, wherein the control unit controls the point of switching the light distribution such that the point is different between the case where a state of the entirety of vehicle existent area contained in partial region changes to a state thereof not contained and the opposite case where a state of the entirety of vehicle existent area not contained in the partial region changes to a state thereof contained.

14. The automotive headlamp apparatus according to claim 12, wherein the headlamp unit is configured to vary the partial region, and the control unit controls the headlamp unit so that the partial region is non-illuminated if the entirety of vehicle existence area is included in a range of variation of the partial region.

15. The automotive headlamp apparatus according to claim 12, wherein the headlamp unit is configured to form a doughnut-shaped light distribution pattern in which a middle portion of the upper beam distribution pattern including an intersection between a horizontal line and a vertical line is non-illuminated.

16. The automotive headlamp apparatus according to claim 12, wherein the headlamp unit is configured to form a concave light distribution pattern in which a middle portion of an upper beam region above a horizontal line of the upper beam distribution pattern is non-illuminated.

17. The automotive headlamp apparatus according to claim 12, wherein the headlamp unit is configured to form a one-sided light distribution pattern in which one side of an upper beam region above a horizontal line of the upper beam distribution pattern in a horizontal direction is non-illuminated.

18. An automotive headlamp apparatus comprising:
a headlamp unit placed in a vehicle; and
a control unit which controls the illumination of the headlamp unit according to a vehicle existent area where a vehicle-in-front travelling in front of a driver's vehicle exists,
wherein the headlamp unit (i) forms a lower beam distribution pattern for illuminating a region immediately in front of the driver's vehicle, (ii) forms an upper beam distribution pattern having a shape different from that of the lower beam distribution pattern and capable of illuminating a region above the region illuminated by the lower beam distribution pattern, and (iii) is configured so that a partial region of the upper beam distribution pattern is capable of being non-illuminated and so that a light axis can swivel, and
wherein the control unit determines the vehicle existent area as a position relative to a light axis direction after a swivel of the headlamp unit,
when the entirety of vehicle existent area is contained within the partial region, the control unit controls the headlamp unit in such a manner that the partial region is non-illuminated; and
when at least a part of the vehicle existent area is contained within a region of the upper beam distribution pattern which is other than the partial region, the control unit controls the headlamp unit in such a manner that the upper beam distribution pattern is not formed.

19. An automotive headlamp apparatus comprising:
a headlamp unit placed in a vehicle; and
a control unit which controls the illumination of the headlamp unit according to a vehicle existent area where a vehicle-in-front travelling in front of a driver's vehicle exists,
wherein the headlamp unit (i) forms a lower beam distribution pattern for illuminating a region immediately in front of the driver's vehicle, (ii) forms an upper beam distribution pattern having a shape different from that of the lower beam distribution pattern and capable of illuminating a region above the region illuminated by the lower beam distribution pattern, and (iii) is configured so that a partial region of the upper beam distribution pattern is capable of being non-illuminated and so that a light axis can swivel, and
wherein the control unit determines the vehicle existent area, based a correction range which is wider by a predetermined angle than a basic range where the vehicle-in-front exists as seen from the driver's vehicle;
when the entirety of vehicle existent area is contained within the partial region, the control unit controls the headlamp unit in such a manner that the partial region is non-illuminated;
when at least a part of the vehicle existent area is contained within a region of the upper beam distribution pattern which is other than the partial region, the control unit controls the headlamp unit in such a manner that the upper beam distribution pattern is not formed; and
when the driver's vehicle is moving along a winding road, the control unit swivels the headlamp unit at an angle which is the sum of a swivel angle occurring while the driver's vehicle is moving along the winding road and a correction angle, and controls the headlamp unit so that the partial region is non-illuminated.

20. The automotive headlamp apparatus according to claim 18, wherein the control unit controls the point of switching the light distribution such that the point is different between the case where a state of the entirety of vehicle existent area contained in partial region changes to a state thereof not contained and the opposite case where a state of the entirety of vehicle existent area not contained in the partial region changes to a state thereof contained.

21. The automotive headlamp apparatus according to claim 18, wherein, when the entirety of vehicle existent area is contained within the partial region as a result of swivel of the headlamp unit, the control unit controls the headlamp unit in such a manner that the partial region is non-illuminated.

* * * * *